(12) United States Patent
Zhou et al.

(10) Patent No.: US 12,086,592 B2
(45) Date of Patent: Sep. 10, 2024

(54) PROCESSOR, PROCESSING METHOD, AND RELATED DEVICE FOR ACCELERATING GRAPH CALCULATION

(71) Applicant: HUAWEI TECHNOLOGIES CO., LTD., Guangdong (CN)

(72) Inventors: Xiping Zhou, Shenzhen (CN); Ruoyu Zhou, Shenzhen (CN); Fan Zhu, Shenzhen (CN); Wenbo Sun, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/070,781

(22) Filed: Nov. 29, 2022

(65) Prior Publication Data
US 2023/0093393 A1 Mar. 23, 2023

Related U.S. Application Data

(63) Continuation of application No. PCT/CN2020/093627, filed on May 30, 2020.

(51) Int. Cl.
*G06F 9/30* (2018.01)
*G06F 9/38* (2018.01)

(52) U.S. Cl.
CPC ...... *G06F 9/30076* (2013.01); *G06F 9/30087* (2013.01); *G06F 9/3836* (2013.01)

(58) Field of Classification Search
CPC .............. G06F 9/3005; G06F 9/30076; G06F 9/30003; G06F 9/30087; G06T 1/20
See application file for complete search history.

(56) References Cited

U.S. PATENT DOCUMENTS 9,984,037 B1 * 5/2018 Kavipurapu .......... G06F 9/4881
10,216,693 B2 2/2019 Nowatzki et al.
(Continued)

FOREIGN PATENT DOCUMENTS

| CN | 102073543 A | 5/2011 |
|---|---|---|
| CN | 208580395 U | 3/2019 |

(Continued)

OTHER PUBLICATIONS

International Search Report and Written Opinion in International Appln. No. PCT/CN2020/093627, mailed on Feb. 20, 2021, 17 pages (with English translation).
(Continued)

*Primary Examiner* — Courtney P Spann
(74) *Attorney, Agent, or Firm* — Fish & Richardson P.C.

(57) ABSTRACT

This application discloses a processor, a processing method, and a related device. The processor includes a processor core. The processor core includes an instruction dispatching unit and a graph flow unit and at least one general-purpose operation unit that are connected to the instruction dispatching unit. The instruction dispatching unit is configured to: allocate a general-purpose calculation instruction in a decoded to-be-executed instruction to the at least one general-purpose calculation unit, and allocate a graph calculation control instruction in the decoded to-be-executed instruction to the graph calculation unit, where the general-purpose calculation instruction is used to instruct to execute a general-purpose calculation task, and the graph calculation control instruction is used to instruct to execute a graph calculation task. The at least one general-purpose operation unit is configured to execute the general-purpose calculation instruction. The graph flow unit is configured to execute the graph calculation control instruction.

16 Claims, 11 Drawing Sheets

(56) References Cited

U.S. PATENT DOCUMENTS

| | | | | |
|---|---|---|---|---|
| 2006/0026571 A1* | 2/2006 | Cabillic | ............. | G06F 12/0802 |
| | | | | 717/133 |
| 2015/0379763 A1* | 12/2015 | Liktor | .................. | G06T 15/005 |
| | | | | 345/426 |
| 2017/0286122 A1* | 10/2017 | Wu | ....................... | G06F 9/5027 |
| 2020/0057613 A1 | 2/2020 | Baker | | |
| 2022/0214861 A1* | 7/2022 | Sohrabizadeh | ........ | G06N 3/082 |
| 2022/0365975 A1* | 11/2022 | Dasika | ................ | G06F 16/9024 |

FOREIGN PATENT DOCUMENTS

| | | |
|---|---|---|
| CN | 110826708 A | 2/2020 |
| JP | 2004005739 A | 1/2004 |
| JP | 2005108086 A | 4/2005 |

OTHER PUBLICATIONS

Office Action in Japanese Appln. No. 2022-573476, mailed on Nov. 7, 2023, 5 pages (with English translation).

Zhou et al., "Accelerating Graph Analytics on CPU-FPGA Heterogeneous Platform," 2017 29th International Symposium on Computer Architecture and High Performance Computing (SBAC-PAD), Oct. 17, 2017, pp. 137-144.

Ham et al., "Graphicionado: A high-performance and energy-efficient accelerator for graph analytics," 2016 49th Annual IEEE/ACM International Symposium on Microarchitecture (Micro), Oct. 15, 2016, pp. 1-13.

Extended European Search Report in European Appln No. 20939004.6, dated May 26, 2023, 10 pages.

\* cited by examiner

PROCESSOR, PROCESSING METHOD, AND RELATED DEVICE FOR ACCELERATING GRAPH CALCULATION

CROSS-REFERENCE TO RELATED APPLICATIONS

This application is a continuation of International Application No. PCT/CN2020/093627, filed on May 30, 2020, which is hereby incorporated by reference in its entirety.

TECHNICAL FIELD

The present application relates to the field of directed graph calculation technologies, and in particular, to a processor, a processing method, and a related device.

BACKGROUND

With increasing data sizes and complexity in various fields, there are increasingly high requirements for a calculation capability and processing performance of a processor. A superscalar (Superscalar) processor (Central Processing Unit, CPU) architecture means that a type of parallel operations of instruction-level parallelism are performed in one processor core, performance is improved by transmitting a plurality of instructions per clock cycle, and a dependency between parallel instructions is resolved by using a hardware logical unit. In this technology, a higher CPU throughput (throughput) can be implemented at a same CPU frequency.

However, due to a dependency between a large quantity of hardware logical units in a superscalar CPU, difficulty in hardware design and verification is increased, and a large amount of energy consumption and a large hardware area are consumed. In addition, because it is increasingly difficult to improve a running frequency, an instruction width, complexity, and the like of the superscalar CPU, performance of the superscalar CPU cannot be linearly scaled (Scale), power consumption increases higher than performance, and energy efficiency deteriorates.

For the foregoing technical problem, in a conventional technology, a solution of a graph flow accelerator is proposed, and is referred to as a specialization engine for explicit dataflow (Specialization Engine for Explicit Dataflow, SEED) architecture. A core idea of the graph flow accelerator is to explicitly (Explicit) describe a dependency between instructions at an instruction set level, and directly display a degree of parallelism between instructions to hardware for execution, to achieve an acceleration effect of the processor. In this architecture, the graph flow accelerator and the superscalar processor are combined into a hybrid architecture, the graph flow accelerator and the superscalar (superscalar) processor share a set of caches, and a set of communication buses are established to transmit register live in (liveIn) in the superscalar processor to the graph flow accelerator. After completing calculation, the graph flow accelerator transmits register live out (liveOut) back to the superscalar processor by using a separate communication bus. After graph calculation ends, a calculation result is transmitted to a register in the superscalar processor. In the SEED architecture, a program segment that is suitable for execution of a graph architecture may be scheduled to the graph flow accelerator for execution, and a program segment that is not suitable for the graph architecture is scheduled to the superscalar processor for execution. Therefore, an effect of switching between a graph architecture and a superscalar architecture is achieved.

However, in the foregoing SEED architecture, an accelerator mode is used; to be specific, the graph flow accelerator and a general-purpose processor are systems that are entirely independent of each other, the graph flow accelerator has independent data and instruction input channels, and the superscalar processor communicates with the graph flow accelerator by using a message channel or a shared memory. In this way, a communication delay between the superscalar processor and the graph flow accelerator is relatively large. In addition, because the graph flow accelerator cannot process an interrupted operating system that cannot run, and cannot be shared by a plurality of progresses, the SEED architecture cannot further improve a degree of parallelism of hardware (the graph flow accelerator and the superscalar processor), and finally cannot improve running efficiency and overall performance of the architecture, and consequently, availability of the graph flow accelerator is significantly reduced.

In summary, how to provide a more effective graph calculation mode to accelerate running of the general-purpose processor becomes an urgent technical problem to be resolved currently.

SUMMARY

Embodiments of the present application provide a processor, a processing method, and a related device, to implement a function of accelerating running of a general-purpose processor in a graph calculation mode.

According to a first aspect, an embodiment of the present application provides a processor, including a processor core. The processor core includes an instruction dispatching unit and a graph flow unit and at least one general-purpose operation unit that are connected to the instruction dispatching unit. The instruction dispatching unit is configured to: allocate a general-purpose calculation instruction in a decoded to-be-executed instruction to the at least one general-purpose calculation unit, and allocate a graph calculation control instruction in the decoded to-be-executed instruction to the graph calculation unit, where the general-purpose calculation instruction is used to instruct to execute a general-purpose calculation task, and the graph calculation control instruction is used to instruct to execute a graph calculation task. The at least one general-purpose operation unit is configured to execute the general-purpose calculation instruction. The graph flow unit is configured to execute the graph calculation control instruction.

An embodiment of the present application provides a processor. The processor implements a function of accelerating running of a general-purpose processor in a graph calculation mode, and specifically includes a design for hardware and a design for software. From a hardware perspective, in this embodiment of the present application, a hardware graph flow unit is added to a processor core (Core) of the processor, and is disposed at a position in an execute pipeline of the processor together with another general-purpose operation unit (such as an arithmetic logical unit or a floating point unit), so that the processor can independently execute an instruction by invoking the graph flow unit, or accelerate graph calculation by invoking the graph flow unit and the another general-purpose operation unit to execute instructions concurrently. From a software perspective, in this embodiment of the present application, an extended instruction (for example, including the graph calculation control instruction) dedicated to graph calculation acceleration is designed based on an instruction set of a general-purpose processor, and at an instruction dispatching stage, the graph calculation control instruction is directly dispatched to the graph flow unit for execution by using an instruction dispatching unit in the processor core, to accelerate graph calculation. In this application, because the graph flow unit is disposed in the processor core, the instruction dispatching unit in the core may be connected to the graph flow unit and directly communicate with the graph flow unit, so that the graph calculation control instruction is directly dispatched to the graph flow unit, and communication is performed without using another message channel or a load/store manner, and in this way, a communication delay is significantly reduced. In addition, because the graph flow unit is disposed in the processor core, synchronous or asynchronous running between the graph flow unit and another operation unit can be controlled, so that a degree of parallelism and operation efficiency of the processor are improved. In addition, some repeatedly executed instruction sequences may be repeatedly executed in a graph architecture (that is, the graph flow unit), to reduce bandwidth and a quantity of times that the processor core fetches an instruction from a memory unit, and reduce overheads of checking a dependency between instructions, jump prediction, and register access, so that an operation resource of the graph flow unit is effectively used, and running efficiency and performance of the processor are further improved. In conclusion, in this application, based on a microarchitecture design of the processor and extension of a related instruction set, the graph architecture is integrated into the general-purpose processor, and is used as an execution unit in the core of the general-purpose processor to independently execute a graph calculation task or concurrently execute a graph calculation task with another general-purpose operation unit at an execute pipeline stage. In this way, the graph flow unit collaborates with one or more general-purpose operation units, so that a function of effectively executing a calculation task in a same processor is implemented.

In a possible implementation, the processor core further includes: an instruction fetching unit, configured to obtain a to-be-executed target program; and an instruction decoding unit, configured to decode the target program to obtain the decoded to-be-executed instruction.

In this embodiment of the present application, the processor core further includes the instruction fetching unit and the instruction decoding unit, and a memory unit is further included outside the processor core. The memory unit outside the processor core stores the to-be-executed target program. The instruction fetching unit in the processor core obtains the to-be-executed target program from the memory unit, and the instruction decoding unit in the core performs decoding to obtain an instruction that may be directly executed by an execution unit (such as the general-purpose operation unit or the graph flow unit) in the processor, so that the instruction is dispatched to the corresponding execution unit for execution.

In a possible implementation, the processor core further includes a result write-back unit, and the graph flow unit and the general-purpose operation unit are separately connected to the result write-back unit. The at least one general-purpose operation unit is further configured to send a first execution result of the general-purpose calculation task to the result write-back unit, where the first execution result of the general-purpose calculation task is a result obtained after the general-purpose calculation instruction is executed. The graph flow unit is further configured to send a second execution result of the graph calculation task to the result write-back unit, where the second execution result of the graph calculation task is a result obtained after the graph calculation control instruction is executed. The result write-back unit is configured to write back one of or both the first execution result and the second execution result to the instruction dispatching unit.

In this embodiment of the present application, the processor core further includes the result write-back unit. The result write-back unit may temporarily store a result obtained after each general-purpose operation unit or graph flow unit performs calculation, and write some or all calculation results back to the instruction dispatching unit, so that the instruction dispatching unit dispatches a related parameter. Further, the result write-back unit may further reorder calculation results obtained through out-of-order execution. For example, calculation results of instructions are reordered in a sequence of fetching the instructions, and an instruction is not submitted until execution of instructions before the instruction is completed, so that an operation result of the entire instruction is completed. The instruction dispatching unit in the processor core also has a right and a condition to obtain a related operation status (that is, an intermediate or final operation result that is temporarily stored in the result write-back unit) of the graph flow unit, so that the graph flow unit can be better controlled and accessed, and synchronous or asynchronous running between the graph flow unit and another execution unit can be further controlled. In this way, a degree of parallelism and running efficiency of the processor are improved.

In a possible implementation, the processor further includes a memory unit, the graph flow unit includes N calculation nodes, the graph calculation control instruction includes a graph build start instruction, and the graph build start instruction carries a target address in the memory unit. The graph flow unit is specifically configured to: receive the graph build start instruction, and read graph build block information from the memory unit based on the target address. The graph build block information includes an operation method of each of the N calculation nodes and connection and sequence information of the N calculation nodes.

In this embodiment of the present application, if the graph calculation control instruction received by the graph flow unit is specifically the graph build start instruction, and the instruction is used to instruct the graph flow unit to read, based on the target address that is in the memory unit outside the processor core and that is carried in the instruction, the graph build block information stored in the memory unit. The graph build block information includes a corresponding operation method of each calculation node in the graph flow unit and a dependency between a plurality of calculation nodes, that is, a relationship between a calculation result and an input condition of calculation nodes in an association relationship (that is, two calculation nodes corresponding to edges during graph calculation). The graph flow unit may complete calculation of a complete graph build block based on the foregoing information. It should be noted that one graph build block may be one graph build block or all graph build blocks during graph calculation; in other words, one complete graph calculation task may include one graph build block or a plurality of graph build blocks that are obtained through splitting.

In a possible implementation, the graph calculation control instruction includes a parameter pass instruction, the parameter pass instruction carries identifiers of M calculation nodes and input parameters separately corresponding to the identifiers of the M calculation nodes, and the M calculation nodes are some or all nodes in the N nodes. The graph flow unit is configured to: receive the parameter pass instruction, and separately input the input parameters separately corresponding to the identifiers of the M calculation nodes into the M calculation nodes.

In this embodiment of the present application, if the graph calculation control instruction received by the graph flow unit is specifically the parameter pass instruction, and the parameter pass instruction includes initial input parameters required by a plurality of calculation nodes in one graph build block calculation process. After the plurality of calculation nodes obtain the corresponding parameters from the outside of the graph flow unit, the graph flow unit meets a condition of starting to execute the graph calculation task, that is, may start to perform graph calculation.

In a possible implementation, the connection and sequence information of the N calculation nodes includes source nodes and destination nodes that are separately corresponding to L edges. The graph flow unit is specifically configured to: monitor whether an input parameter required by each of the N calculation nodes is ready; input an input parameter of a target calculation node whose input parameter is ready into an operation method corresponding to the target calculation node for calculation, to obtain a calculation result: and input a calculation result of a source node on each edge into a corresponding destination node as an input parameter based on the source nodes and the destination nodes that are separately corresponding to the L edges.

In this embodiment of the present application, each calculation node in the graph flow unit may start to perform graph calculation provided that an operation method of the calculation node is loaded and an input parameter of the calculation node is obtained. However, some calculation nodes (for example, source nodes corresponding to edges) obtain initial input parameters from the outside of the graph flow unit, and some other calculation nodes (for example, destination nodes corresponding to edges) may need to wait for completion of calculation of calculation nodes (for example, source nodes) in an association relationship with the calculation nodes before using calculation results of the calculation nodes as input parameters of the calculation nodes to start graph calculation. Therefore, calculation start time of calculation nodes may be inconsistent. However, each calculation node may start an operation after an operation method and an input parameter (which may include a left input parameter, a right input parameter, or a conditional parameter) are ready.

In a possible implementation, the graph calculation control instruction includes a graph calculation start instruction. The graph flow unit is specifically configured to: after receiving the graph calculation start instruction, check whether the graph build block information read by the graph flow unit is consistent with an address of a pre-started graph build block, and determine whether the input parameters in the M calculation nodes have been input: and if the graph build block information is consistent with the address of the pre-started graph build block and the input parameters in the M calculation nodes have been input, start to execute the graph calculation task.

In this embodiment of the present application, the graph flow unit is triggered, by using the graph calculation start instruction in the graph calculation control instruction, to perform related check before starting calculation (for example, including: checking whether the graph build block information is correct and whether the initial input parameter is ready). After completing the foregoing check, the graph flow unit determines that graph building is completed, and may start to execute the graph calculation task.

In a possible implementation, the instruction dispatching unit is further configured to: after the graph flow unit receives the graph calculation start instruction before the graph calculation task is completed, control the processor core to enter a blocking state. Further optionally, the instruction dispatching unit is further configured to: after the graph flow unit completes the graph calculation task, control the processor core to exit the blocking state.

In this embodiment of the present application, the processor core may enable a graph calculation function in a synchronous manner (in other words, the graph flow unit and another general-purpose operation unit may execute tasks in series). In other words, when the graph flow unit executes the graph calculation task, a pipeline of the processor core is blocked, and the graph flow unit does not exit the blocking state until the graph flow unit completes the graph calculation task, to ensure that in this period, only the graph flow unit is executing a task, but another operation unit temporarily cannot execute a task. In this way, power consumption of the processor is reduced. The instruction may implement switching of a calculation mode between another operation unit in the processor core and the graph flow unit, and may be applied to synchronously operated programs.

In a possible implementation, the instruction dispatching unit is further configured to: send an execution result synchronization instruction to the graph flow unit, and after the graph flow unit receives the execution result synchronization instruction and before the graph calculation task is completed, control the processor core to enter a blocking state. Further optionally, the instruction dispatching unit is further configured to: after the graph flow unit completes the graph calculation task, control the processor core to exit the blocking state.

In this embodiment of the present application, the processor core may enable a graph calculation function in an asynchronous manner (in other words, the graph flow unit and another general-purpose operation unit may execute tasks in parallel). In other words, when the graph flow unit executes the graph calculation task, a pipeline of the processor core is not blocked, and another operation unit can run normally: When the processor sends the execution result synchronization instruction to the graph flow unit by using the instruction dispatching unit (for example, when an operation of the another operation unit needs to depend on an execution result of the graph flow unit), if the graph flow unit has not completed the graph calculation task in this case, the pipeline of the processor core is controlled to be blocked, and the processor core exits the blocking state only after the graph flow unit completes the graph calculation task and feeds back the execution result, to ensure that when the another operation unit needs the execution result of the graph flow unit, the another operation unit may continue running when the graph flow unit feeds back the execution result. In this way, it is ensured that a degree of parallelism of the processor core is improved. The instruction may implement a calculation mode in which the another operation unit in the processor and the graph flow unit are parallel, and may be applied to asynchronously operated programs.

In a possible implementation, the processor core further includes a result write-back unit, and the write-back unit includes a plurality of registers. The graph flow unit and the at least one general-purpose operation unit are separately connected to the result write-back unit. The graph calculation control instruction includes a parameter return instruction, and the parameter return instruction carries identifiers of K calculation nodes and registers separately corresponding to the identifiers of the K calculation nodes. The graph flow unit is specifically configured to control to separately send calculation results of the K calculation nodes to the corresponding registers in the result write-back unit.

In this embodiment of the present application, for the N calculation nodes of the graph flow unit, after completing final calculation, some calculation nodes may need to output calculation results into the result write-back unit outside the graph flow unit; in other words, the graph flow unit may control, based on the identifiers that are of the K calculation nodes and that are carried in the parameter return instruction in the received graph calculation control instruction, to use final calculation results of the K calculation nodes as a calculation result of an entire graph build block, and output the calculation result to the result write-back unit outside the graph flow unit, so that a subsequent execution unit performs further calculation based on the calculation result.

In a possible implementation, a general-purpose operation instruction includes a general-purpose arithmetic logical instruction. The at least one general-purpose operation unit includes an arithmetic logical unit ALU, configured to: receive the general-purpose arithmetic logical instruction sent by the instruction dispatching unit, and perform a logical operation. Optionally, the general-purpose operation instruction includes a load/store instruction. The at least one general-purpose operation unit includes a load/store unit LSU, configured to: receive the load/store instruction sent by the instruction dispatching unit, and perform a load/store operation.

In this embodiment of the present application, the at least one operation unit may further include the arithmetic logical unit or the load/store unit. The arithmetic logical unit is mainly configured to perform a related logical operation, and the load/store unit is configured to perform a load/store operation. In other words, the foregoing units and the graph flow unit are at an execute pipeline stage, and jointly complete calculation tasks of various types after decoding in the CPU, and the calculation tasks may be executed in parallel or in series, or may be partially executed in parallel and partially executed in series, to more efficiently complete a calculation task of the processor.

In a possible implementation, the graph calculation control instruction includes a data read/write instruction, and the data read/write instruction carries a load/store address. The graph flow unit is further configured to read data from the load/store unit LSU or write data into the load/store unit LSU based on the load/store address in the data read/write instruction.

In this embodiment of the present application, the graph flow unit in the processor core may multiplex a function of the load/store unit in the processor core, and read data from or write data into the load/store unit LSU based on a read/write address in a related data read/write instruction.

In a possible implementation, the at least one general-purpose operation unit further includes a floating point unit FPU, and the graph calculation task includes a floating point operation. The graph flow unit is further configured to: send data of the floating point operation to the floating point unit FPU for calculation, and receive a calculation result fed back by the FPU. Optionally, the at least one general-purpose operation unit further includes a vector operation unit SIMD. The graph calculation task includes a vector operation. The graph flow unit is further configured to: send data of the vector operation to the vector operation unit SIMD for calculation, and receive a calculation result fed back by the SIMD.

In this embodiment of the present application, the general-purpose operation unit in this embodiment of the present application may further include the floating point unit FPU and/or the vector operation unit SIMD. The floating point unit is configured to execute a floating point operation task in which an operation has a higher requirement for data precision, and the vector operation unit may be configured to perform a single instruction multiple data operation. In addition, both the general-purpose operation unit and the graph flow unit are at an execute pipeline stage, and there is a data transmission channel between the general-purpose operation unit and the graph flow unit. Therefore, in a process of processing the graph calculation task, if there is a calculation task related to a floating point operation or a single instruction multiple data calculation task, the graph flow unit may send the calculation task to a corresponding general-purpose operation unit for an operation through the corresponding data transmission channel, and there is no need to repeatedly dispose a corresponding processing unit in the graph flow unit to process a corresponding type of operation task. Therefore, a hardware area and overheads are significantly reduced.

According to a second aspect, an embodiment of the present application provides a processing method applied to a processor. The processor includes a processor core. The processor core includes an instruction dispatching unit and a graph flow unit and at least one general-purpose operation unit that are connected to the instruction dispatching unit. The method includes:

the instruction dispatching unit allocates a general-purpose calculation instruction in a decoded to-be-executed instruction to the at least one general-purpose calculation unit, and allocates a graph calculation control instruction in the decoded to-be-executed instruction to the graph calculation unit, where the general-purpose calculation instruction is used to instruct to execute a general-purpose calculation task, and the graph calculation control instruction is used to instruct to execute a graph calculation task;

the at least one general-purpose operation unit executes the general-purpose calculation instruction; and the graph flow unit executes the graph calculation control instruction.

In a possible implementation, the processor core further includes an instruction fetching unit and an instruction decoding unit, and the method further includes:

the instruction fetching unit obtains a to-be-executed target program; and the instruction decoding unit decodes the target program to obtain the decoded to-be-executed instruction.

In a possible implementation, the processor core further includes a result write-back unit, and the graph flow unit and the general-purpose operation unit are separately connected to the result write-back unit. The method further includes:

the at least one general-purpose operation unit sends a first execution result of the general-purpose calculation task to the result write-back unit, where the first execution result of the general-purpose calculation task is a result obtained after the general-purpose calculation instruction is executed;

the graph flow unit sends a second execution result of the graph calculation task to the result write-back unit, where the second execution result of the graph calculation task is a result obtained after the graph calculation control instruction is executed; and the result write-back unit writes back one of or both the first execution result and the second execution result to the instruction dispatching unit.

In a possible implementation, the processor further includes a memory unit, the graph flow unit includes N calculation nodes, the graph calculation control instruction includes a graph build start instruction, the graph build start instruction carries a target address in the memory unit, and that the graph flow unit executes the graph calculation control instruction includes:

the graph flow unit receives the graph build start instruction, and reads graph build block information from the memory unit based on the target address, where the graph build block information includes an operation method of each of the N calculation nodes and connection and sequence information of the N calculation nodes.

In a possible implementation, the graph calculation control instruction includes a parameter pass instruction, the parameter pass instruction carries identifiers of M calculation nodes and input parameters separately corresponding to the identifiers of the M calculation nodes, the M calculation nodes are some or all nodes in the N nodes, and that the graph flow unit executes the graph calculation control instruction includes:

the graph flow unit receives the parameter pass instruction, and separately inputs the input parameters separately corresponding to the identifiers of the M calculation nodes into the M calculation nodes.

In a possible implementation, the connection and sequence information of the N calculation nodes includes source nodes and destination nodes that are separately corresponding to L edges, and that the graph flow unit executes the graph calculation control instruction includes:

the graph flow unit monitors whether an input parameter required by each of the N calculation nodes is ready, inputs an input parameter of a target calculation node whose input parameter is ready into an operation method corresponding to the target calculation node for calculation, to obtain a calculation result, and inputs a calculation result of a source node on each edge into a corresponding destination node as an input parameter based on the source nodes and the destination nodes that are separately corresponding to the L edges.

In a possible implementation, the graph calculation control instruction includes a graph calculation start instruction, and that the graph flow unit executes the graph calculation control instruction to obtain an execution result of the graph calculation task includes:

after receiving the graph calculation start instruction, the graph flow unit checks whether the graph build block information read by the graph flow unit is consistent with an address of a pre-started graph build block, and determines whether the input parameters in the M calculation nodes have been input, and if the graph build block information is consistent with the address of the pre-started graph build block and the input parameters in the M calculation nodes have been input, starts to execute the graph calculation task.

In a possible implementation, the method further includes:

after the graph flow unit receives the graph calculation start instruction and before the graph calculation task is completed, the instruction dispatching unit controls the processor core to enter a blocking state.

In a possible implementation, the method further includes:

the instruction dispatching unit sends an execution result synchronization instruction to the graph flow unit, and after the graph flow unit receives the execution result synchronization instruction and before the graph calculation task is completed, controls the processor core to enter a blocking state.

In a possible implementation, the method further includes:

after the graph flow unit completes the graph calculation task, the instruction dispatching unit controls the processor core to exit the blocking state.

In a possible implementation, the processor core further includes a result write-back unit, and the write-back unit includes a plurality of registers. The graph flow unit and the at least one general-purpose operation unit are separately connected to the result write-back unit. The graph calculation control instruction includes a parameter return instruction, and the parameter return instruction carries identifiers of K calculation nodes and registers separately corresponding to the identifiers of the K calculation nodes. That the graph flow unit executes the graph calculation control instruction to obtain an execution result of the graph calculation task includes:

the graph flow unit controls to separately send calculation results of the K calculation nodes to the corresponding registers in the result write-back unit.

In a possible implementation, the general-purpose operation instruction includes a general-purpose arithmetic logical instruction, the at least one general-purpose operation unit includes an arithmetic logical unit ALU, and that the at least one general-purpose operation unit executes the general-purpose calculation instruction includes:

the arithmetic logical unit ALU receives a general-purpose arithmetic logical instruction sent by the instruction dispatching unit, and performs a logical operation.

Alternatively, in a possible implementation, the general-purpose operation instruction includes a load/store instruction, the at least one general-purpose operation unit includes a load/store unit LSU, and that the at least one general-purpose operation unit executes the general-purpose calculation instruction to obtain an execution result of the general-purpose calculation task includes:

the load/store unit LSU receives a load/store instruction sent by the instruction dispatching unit, and performs a load/store operation.

In a possible implementation, the graph calculation control instruction includes a data read/write instruction, and the data read/write instruction carries a load/store address. The method further includes:

the graph flow unit reads data from the load/store unit LSU or writes data into the load/store unit LSU based on the load/store address in the data read/write instruction.

In a possible implementation, the at least one general-purpose operation unit further includes a floating point unit FPU, and the graph calculation task includes a floating point operation. The method further includes:

the graph flow unit sends data of the floating point operation to the floating point unit FPU for calculation, and receives a calculation result fed back by the FPU.

Alternatively, in a possible implementation, the at least one general-purpose operation unit further includes a vector operation unit SIMD, and the graph calculation task includes a vector operation. The method further includes:

the graph flow unit sends data of the vector operation to the vector operation unit SIMD for calculation, and receives a calculation result fed back by the SIMD.

According to a third aspect, this application provides a semiconductor chip, and the semiconductor chip may include the processor provided in any implementation of the first aspect.

According to a fourth aspect, this application provides a semiconductor chip, and the semiconductor chip may include the processor provided in any implementation of the first aspect, an internal memory coupled to a multi-core processor, and an external memory.

According to a fifth aspect, this application provides a system-on-a-chip SoC chip, and the SoC chip may include the processor provided in any implementation of the first aspect, an internal memory coupled to the processor, and an external memory. The SoC chip may include a chip, or may include a chip and another discrete device.

According to a sixth aspect, this application provides a chip system, and the chip system may include the multi-core processor provided in any implementation of the first aspect. In a possible design, the chip system further includes a memory, and the memory is configured to store program instructions and data that are necessary for the multi-core processor in a running process. The chip system may include a chip, or may include a chip and another discrete component.

According to a seventh aspect, this application provides a processing apparatus, and the processing apparatus has a function of implementing any processing method in the second aspect. The function may be implemented by hardware, or may be implemented by hardware executing corresponding software. The hardware or the software includes one or more modules corresponding to the function.

According to an eighth aspect, this application provides a terminal, the terminal includes a processor, and the processor is the processor provided in any implementation of the first aspect. The terminal may further include a memory, and the memory is configured to be coupled to the processor, and stores program instructions and data that are necessary for the terminal. The terminal may further include a communication interface used by the terminal to communicate with another device or a communication network.

According to a ninth aspect, this application provides a computer-readable storage medium. The computer-readable storage medium stores a computer program, and when the computer program is executed by a processor, a procedure of the processing method in any implementation of the second aspect is implemented.

According to a tenth aspect, an embodiment of the present application provides a computer program. The computer program includes an instruction, and when the computer program is executed by a processor, the processor may be enabled to perform a procedure of the processing method in any implementation of the second aspect.

DESCRIPTION OF EMBODIMENTS

Figure 1:
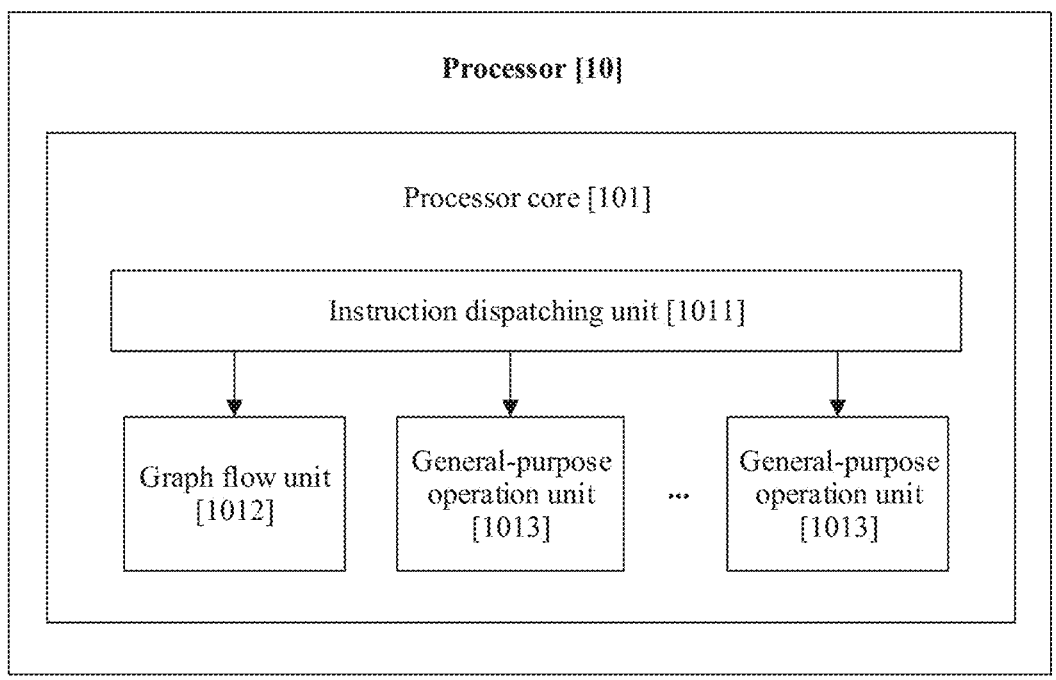
FIG. 1 is a schematic diagram of a structure of a processor according to an embodiment of the present application.

The following describes embodiments of the present application with reference to the accompanying drawings in embodiments of the present application.

In the specification, claims, and accompanying drawings of this application, terms "first", "second", "third", "fourth" and so on are intended to distinguish between different objects but do not indicate a particular order. In addition, terms "include", "have", and any other variant thereof are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

"An embodiment" mentioned in the specification means that a particular characteristic, structure, or feature described with reference to the embodiment may be included in at least one embodiment of the present application. The phrase shown in various locations in the specification may not necessarily refer to a same embodiment, and is not an independent or optional embodiment exclusive from another embodiment. It is explicitly and implicitly understood by a person skilled in the art that embodiments described in the specification may be combined with another embodiment.

Terms such as "component". "module", and "system" used in this specification are used to indicate a computer-related entity, hardware, firmware, a combination of hardware and software, software, or software being executed. For example, a component may be, but is not limited to, a process that is run on a processor, a processor, an object, an executable file, a thread of execution, a program, and/or a computer. By way of illustration, both an application that is run on a calculation device and the calculation device may be components. One or more components may reside within a process and/or a thread of execution, and a component may be located on one computer and/or distributed between two or more computers. In addition, these components may be executed by various computer-readable media that store various data structures. The components may communicate by using a local and/or remote process and based on, for example, a signal having one or more data packets (for example, data from two components interacting with another component in a local system, in a distributed system, and/or across a network such as the internet interacting with other systems by using the signal).

Some terms in this application are first described, so as to help a person skilled in the art have a better understanding.

(1) A graph (Graph) is an abstract data structure used to represent an association relationship between objects, and is described by using a vertex (Vertex) and an edge (Edge): The vertex represents an object, and the edge represents a relationship between objects.

(2) A superscalar (superscalar) processor architecture means that a type of parallel operations of instruction-level parallelism are performed in one processor core. In this technology, a higher CPU throughput (throughput) can be implemented at a same CPU frequency.

(3) Single instruction multiple data (Single Instruction Multiple Data, SIMD): A plurality of operands can be copied, and the plurality of operands are packed in a group of instruction sets of a large register.

(4) An instruction pipeline is a manner in which an operation of an instruction is divided into a plurality of sub-steps and each step is completed by a dedicated circuit, to improve efficiency of instruction execution of a processor. For example, execution of an instruction needs to undergo three stages: instruction fetch, decode, and execute. Each stage requires one machine cycle. If a pipeline technology is not used, three machine cycles are required to execute the instruction. If an instruction pipeline technology is used, when the instruction completes "instruction fetch" and enters "decode", a next instruction can enter "instruction fetch". In this way, instruction execution efficiency is improved.

(5) An execution unit (Execution Unit. EU) is responsible for instruction execution. Actually, the execution unit has both a function of a controller and a function of an operator.

(6) A register file (register file), also referred to as a register stack, is an array including a plurality of registers in a CPU, and is generally implemented by a fast synchronous static random access memory (SRAM). Such a RAM has a dedicated read port and a dedicated write port, and can concurrently access different registers in a plurality of paths.

(7) An integrated circuit (Integrated Circuit, IC) is a microelectronic device or component. Elements such as a transistor, a resistor, a capacitor, and an inductor that are required by a circuit are interconnected to a wire by using a specific technology, and are manufactured on one semiconductor chip or dielectric substrate or several semiconductor chips or dielectric substrates, and then, are packaged into one tube, to form a microstructure with a required circuit function. In other words, the IC chip is a chip manufactured by placing, on a plastic substrate, an integrated circuit including a large quantity of microelectronic components (the transistor, the resistor, the capacitor, and the like).

First, to facilitate understanding of embodiments of the present application, an architecture of a processor and an involved instruction set in this application are further analyzed and proposed.

Currently, in a general-purpose processor of a von Neumann architecture (which may also be referred to as a control-flow architecture (Control-Flow Architecture)), a core idea is to drive an operation by using an instruction; to be specific, the processor successively reads instructions in an execution sequence of the instructions, and then invokes data based on control information included in the instructions, to perform processing. A problem confronted with the foregoing control-flow architecture is how to ensure that an instruction is always driven to be executed without being stalled (stall) while a condition of running at a dominant frequency is met, so that performance of the processor is improved. Based on this background, technologies such as superscalar, a very long instruction word, a dynamic dispatching algorithm, and instruction prefetching are generated to improve the performance of the processor. However, there is still a problem of high performance overheads in these technologies. In addition, a data flow architecture (Dataflow Architecture) used to resolve the foregoing problem is generated. In the data flow architecture, a dependency between instructions is explicitly (Explicit) described at an instruction set level, and a degree of parallelism of instructions is directly displayed to hardware for execution. The data flow architecture may be abstracted into a directed graph including N nodes. A connection between nodes represents one data flow (Dataflow). Once an input of each node is ready (Ready), a current node may perform an operation and transmit a result to a next node. Therefore, nodes in a same graph but not on a same path may run concurrently, so that a degree of processing parallelism is improved. Currently, a conventional data flow architecture further needs to support a control flow. Therefore, in this application, (a data flow+a control flow) are collectively referred to as a graph architecture (Graph Architecture) first. It should be noted that the control flow in the graph architecture is not entirely equivalent to a control flow of a general-purpose processor. A control flow in a general-purpose processor architecture is mainly an execution instruction for a general-purpose operation. The control flow in the graph architecture is mainly various graph calculation control instructions (such as a switch/gate/predicate/gate instruction) in the graph.

To resolve a disadvantage in a conventional technology, this application proposes the following solution: A graph architecture (a data flow+a control flow) is fused into a general-purpose processor architecture and is used as an execution unit (a graph flow unit (Graph Flow Unit, GFU) in this application) in a processor core (Core) to synchronously or asynchronously execute calculation tasks with another execution unit. Further, in this application, based on a control flow architecture of a general-purpose processor, a processor is further designed to perform a general-purpose calculation function and a related function of controlling running of the graph flow unit, and a calculation function in the graph flow unit is designed based on the (data flow+control flow) architecture applicable to graph calculation. In other words, a general-purpose calculation task part is still calculated in a control flow manner, and a graph calculation task part (for example, a hotspot loop and a hotspot instruction sequence) is calculated in a (data flow+control flow) manner, so that a function of accelerating running of the general-purpose processor is implemented by using a graph architecture. Because the graph flow unit is disposed in a processor core of the processor, the graph flow unit may directly communicate with another functional module or execution unit in the processor core without using another message channel or a load/store manner, so that a communication delay is significantly reduced. In addition, because the graph flow unit is disposed in the processor core of the processor, the processor core may better control and access the graph flow unit, so that synchronous or asynchronous running between the graph flow unit and another hardware unit can be controlled, and a degree of parallelism and operation efficiency of the processor are improved. In addition, some repeatedly executed instruction sequences may be repeatedly executed in the graph architecture (that is, the graph flow unit), to reduce bandwidth and a quantity of times that the processor core fetches an instruction from a memory unit, and reduce overheads of checking a dependency between instructions, jump prediction, and register access, so that an operation resource of the graph flow unit is effectively used, and running efficiency and performance of the processor are further improved.

It should be noted that graph calculation involved in this application is directed graph calculation, and details are not described subsequently.

In the foregoing processor architecture provided in this application, an instruction that is suitable for execution in the graph architecture may be dispatched to the graph flow unit in the processor core for execution, and an instruction that is not suitable for the graph architecture is dispatched to another general-purpose operation unit in the processor core for execution: and in addition, the processor may separately invoke the GFU for execution, or may simultaneously invoke the GFU and another execution unit for concurrent execution. Therefore, a problem in a conventional technology that running efficiency of the processor is low due to high switching overheads, a low degree of parallelism, and inability to be shared by a plurality of progresses in a graph acceleration processor (such as a SEED) architecture is resolved, and a processing and running function of a high degree of parallelism, low power consumption, and high energy efficiency is implemented, so that performance and energy efficiency are improved.

Based on the foregoing processor architecture provided in this application, an embodiment of the present application further provides a pipeline structure applicable to the foregoing processor architecture. A life cycle of an instruction in the pipeline structure may include an instruction fetch pipeline→a decode pipeline→a dispatch (issue) pipeline→an execute pipeline→a memory access pipeline→a write back pipeline; in other words, in the pipeline structure, an execution process of an instruction is divided into at least the following six stages.

Instruction fetch pipeline: Instruction fetch (Instruction Fetch) is a process of reading the instruction from a memory.

Decode pipeline: Instruction decode (Instruction Decode) is a process of translating the instruction fetched from the memory.

Dispatch (issue) pipeline: In instruction dispatch and issue (Instruction Dispatch and Issue), a register is read to obtain an operand, and an instruction is sent to a corresponding execution unit (EU) for execution based on a type of the instruction.

Execute pipeline: A type of calculation that needs to be performed after the instruction is decoded is known, and a required operand has been read from a general-purpose register set. Then, instruction execute (Instruction Execute) is performed based on the type of the instruction, to complete a calculation task. Instruction execute is a process of performing a real operation on the instruction. For example, if the instruction is an addition operation instruction, an addition operation is performed on the operand; if the instruction is a subtraction operation instruction, a subtraction operation is performed; and if the instruction is graph calculation, a graph calculation operation is performed.

Memory access pipeline: Memory access (Memory Access) is a process in which a memory access instruction reads data from the memory or writes data into the memory, and a load/store (load/store) instruction is mainly executed.

Write back pipeline: Write back (Write Back) is a process of writing an instruction execution result back to a general-purpose register set. If the instruction is a common operation instruction, a value of the result comes from a result of calculation at the "execute" stage. If the instruction is a memory read instruction, the result comes from data read from the memory at the "memory access" stage.

In the foregoing pipeline structure, each instruction in the processor needs to undergo the foregoing operation steps. However, different operation steps of a plurality of instructions may be performed simultaneously, and therefore an instruction flow speed may be accelerated generally, and program execution time is shortened. It may be understood that the processor architecture and the pipeline structure of the processor are merely some example implementations provided in embodiments of the present application. The processor architecture and the pipeline structure of the processor in embodiments of the present application include but are not limited to the foregoing implementations.

Based on the processor architecture and the pipeline structure of the processor, this application provides a processor. FIG. 1 is a schematic diagram of a structure of a processor according to an embodiment of the present application. A processor 10 may be located in any electronic device, for example, various devices such as a computer, a mobile phone, a tablet computer, a personal digital assistant, an intelligent wearable device, an intelligent vehicle-mounted device, or a smart home appliance. The processor 10 may be specifically a chip, a chipset, or a circuit board on which a chip or a chipset is mounted. The chip, the chipset, or the circuit board on which the chip or the chipset is mounted may work when driven by necessary software. Specifically:

The processor 10 may include at least one processor core 101, and the processor core 101 may include an instruction dispatching unit 1011 and a graph flow unit 1012 and at least one general-purpose operation unit 1013 that are connected to the instruction dispatching unit 1011. The instruction dispatching unit 1011 runs at an issue pipeline stage of the processor core 101, to complete dispatching and distribution of a to-be-executed instruction. In addition, both the graph flow unit 1012 and the at least one general-purpose operation unit 1013 are used as execution units (EU, also referred to as a functional unit FU) of the processor 10 and run at an execute pipeline stage (Execute Stage), to complete each type of calculation task. Specifically, the processor 10 may directly allocate a graph calculation task in the to-be-executed instruction to the graph flow unit 1012 for execution by using the instruction dispatching unit 1011, to implement a function of accelerating a general-purpose processor by using a graph calculation mode, and dispatch a general-purpose calculation task in the to-be-executed instruction to the at least one general-purpose operation unit 1013 for execution, to implement a general-purpose calculation function. Optionally, based on different calculation tasks, the processor 10 may invoke only the graph flow unit 1012 to execute a task, or may invoke only the at least one general-purpose operation unit 1013 to execute a task, or may invoke both the graph flow unit 1012 and the at least one general-purpose operation unit 1013 to execute tasks in parallel. It may be understood that the instruction dispatching unit 1011 may be connected to the graph flow unit 1012 and the at least one general-purpose operation unit 103 by using a bus or in another manner, to directly perform communication. A connection relationship shown in FIG. 1 does not constitute a limitation on a connection relationship between the instruction dispatching unit 1011 and both the graph flow unit 1012 and the at least one general-purpose operation unit 103.

Figure 2:
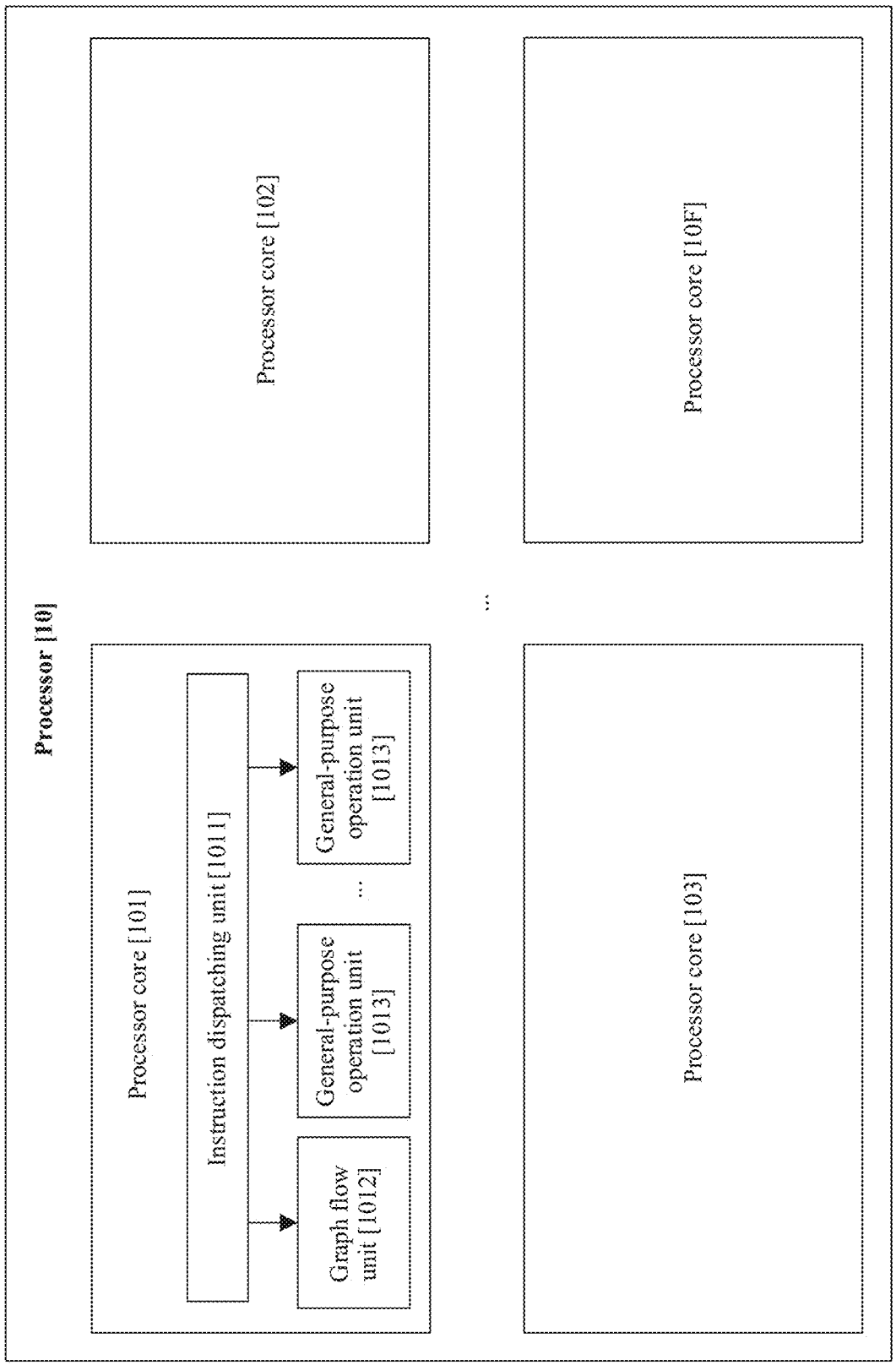
FIG. 2 is a schematic diagram of a structure of another processor according to an embodiment of the present application.

In a possible implementation. FIG. 2 is a schematic diagram of a structure of another processor according to an embodiment of the present application. A processor 10 may include a plurality of processor cores (F processor cores are used as an example in FIG. 2, and F is an integer greater than 1), such as a processor core 101, a processor core 102, a processor core 103, . . . , and a processor core 10F. The processor cores may be homogeneous or heterogeneous; in other words, a structure of the processor core (102, 103, . . . , or 10F) and a structure of the processor core 101 may be the same or different. This is not specifically limited in this embodiment of the present application. Optionally, the processor core 101 may be used as a primary processing core, and the processor cores (102, 103, . . . , and 10F) may be used as secondary processing cores, and the primary processing core and the (F-1) secondary processing cores may be located on one or more chips (ICs). It may be understood that the primary processing core 101 and the (F-1) secondary processing cores may be coupled and communicate with each other by using a bus or in another manner. This is not specifically limited herein. It should be noted that the pipeline structure may be different based on a structure of each processor core. Therefore, the pipeline structure in this application is a pipeline structure of the processor core 101, and a pipeline structure of another processor core is not specifically limited.

Figure 3:
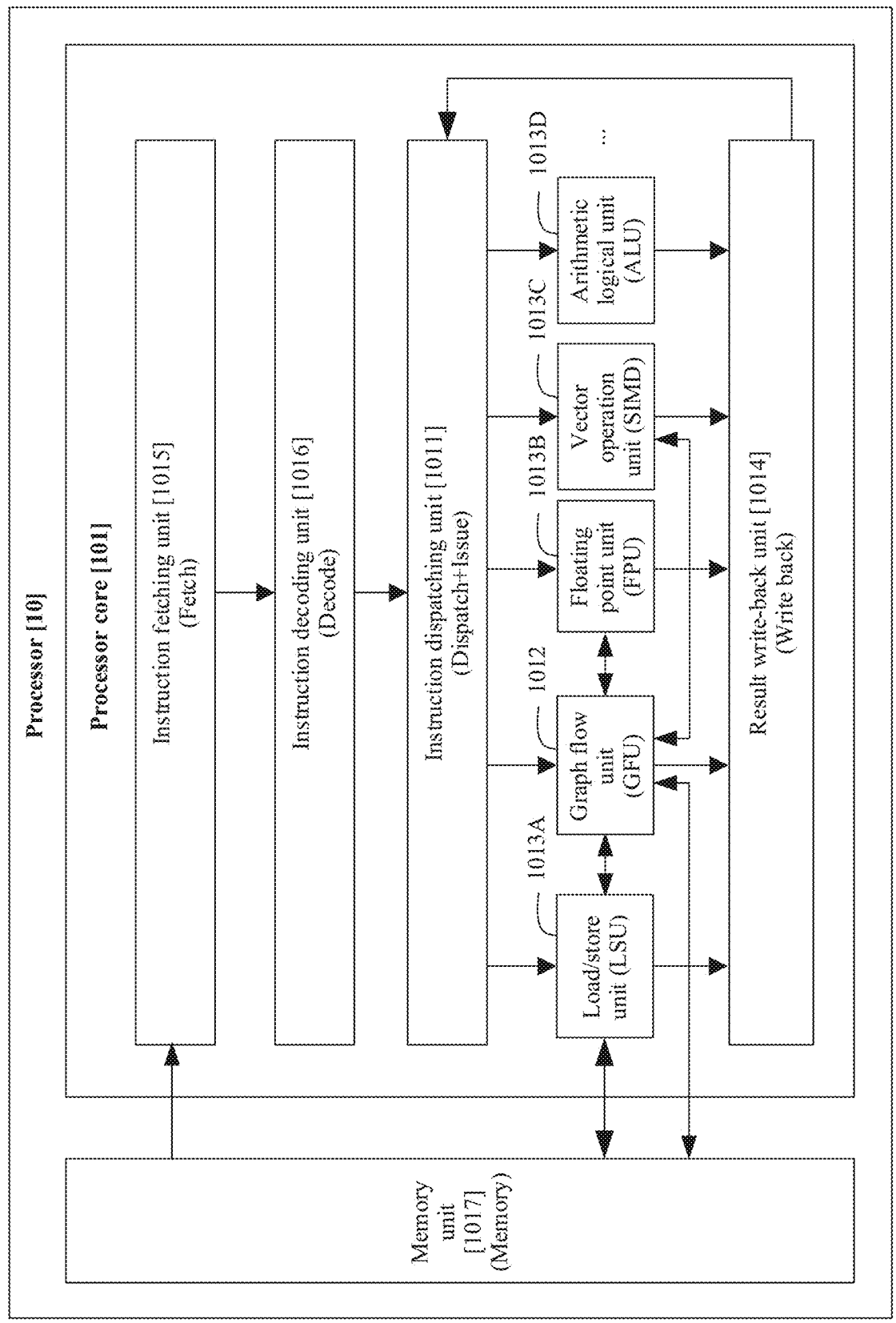
FIG. 3 is a schematic diagram of a structure of still another processor according to an embodiment of the present application.

In a possible implementation. FIG. 3 is a schematic diagram of a structure of still another processor according to an embodiment of the present application. The processor core 101 may further include an instruction fetching unit 1015 and an instruction decoding unit 1016 that respectively run at an instruction fetch pipeline stage and a decode pipeline stage and complete a corresponding instruction fetching function and a corresponding instruction decoding function. Optionally, as shown in FIG. 3, the at least one general-purpose operation unit 1013 may specifically include one or more of a load/store unit (LSU) 1013A, a floating point unit (FPU) 1013B, a vector operation unit (SIMD) 1013C, and an arithmetic logical unit (ALU) 1013D. The foregoing plurality of general-purpose operation units (including 1013A, 1013B, 1013C, and the SIMD) and the graph flow unit 1012 are all connected to the instruction dispatching unit 1011, and run at an execute pipeline stage as execution units (EU) of the processor. The execution units separately receive different types of instructions dispatched by the instruction dispatching unit 1011, to execute, based on different hardware structures of the execution units, operation tasks that the execution units are good at. Further optionally, a memory unit 1017 is further included outside the processor core 101 of the processor 10, and the load/store unit (LSU) reads/writes data from/into the memory unit 1017 and runs at a memory access pipeline stage. Still further optionally, the processor core 101 further includes a result write-back unit 1014 that runs at a write back pipeline stage and is responsible for writing a calculation result of the instruction back to a destination register. Optionally, the memory unit 1017 is generally a power-off volatile memory. During power off, content stored in the memory unit 1017 is lost, and the memory unit may also be referred to as a memory (Memory) or a primary memory. The memory unit 1017 may be used as an operating system in the processor 10 or a storage medium for temporary data of another running program. For example, an operating system running on the processor 10 dispatches data that needs to be operated from the memory unit 1017 to the processor core 101 to perform the operation. After the operation is completed, the processor core 101 transmits a result. An internal memory 101 may include one or more of a dynamic random access memory (DRAM), a static random access memory (SRAM), a synchronous dynamic random access memory (SDRAM), a level 1 cache (L1 Cache), a level 2 cache (L2 Cache), a level 3 cache (L3 Cache), and the like.

It should be noted that the functional modules in the processor in FIG. 3 may communicate with each other by using a bus or in another connection manner, and a connection relationship shown in FIG. 3 does not limit a connection relationship between the functional modules. The functional modules are further described in subsequent embodiments. Details are not described herein.

It may be understood that structures of the processors in FIG. 1, FIG. 2, and FIG. 3 are merely some example implementations provided in embodiments of the present application. A structure of the processor in embodiments of the present application includes but is not limited to the foregoing implementations.

Based on a microarchitecture of the processor provided in FIG. 1, FIG. 2, and FIG. 3 in this application, in the following embodiments of the present application, a function specifically implemented by the processor 10 may include the following:

The instruction fetching unit 1015 obtains a to-be-executed target program from the memory unit 1017. The instruction decoding unit 1016 decodes the target program based on a predetermined instruction format to obtain a decoded to-be-executed instruction. The instruction dispatching unit 1011 receives the decoded to-be-executed instruction. The to-be-executed instruction includes a general-purpose calculation instruction and a graph calculation control instruction, the general-purpose calculation instruction is used to instruct to execute a general-purpose calculation task, and the graph calculation control instruction is used to instruct to execute a graph calculation task. The instruction dispatching unit 1011 sends the general-purpose calculation instruction to the at least one general-purpose operation unit, and sends the graph calculation control instruction to the graph flow unit. The at least one general-purpose operation unit 1013 receives and executes the general-purpose calculation instruction to obtain an execution result of the general-purpose calculation task. The graph flow unit 1012 receives and executes the graph calculation control instruction to obtain an execution result of the graph calculation task. The at least one general-purpose operation unit 1013 further sends a first execution result of the general-purpose calculation task to the result write-back unit 1014. The graph flow unit 1012 further sends a second execution result of the graph calculation task to the result write-back unit 1014. The result write-back unit 1014 stores the first execution result and the second execution result, and writes back one of or both the first execution result and the second execution result to the instruction dispatching unit 1011.

Figure 4:
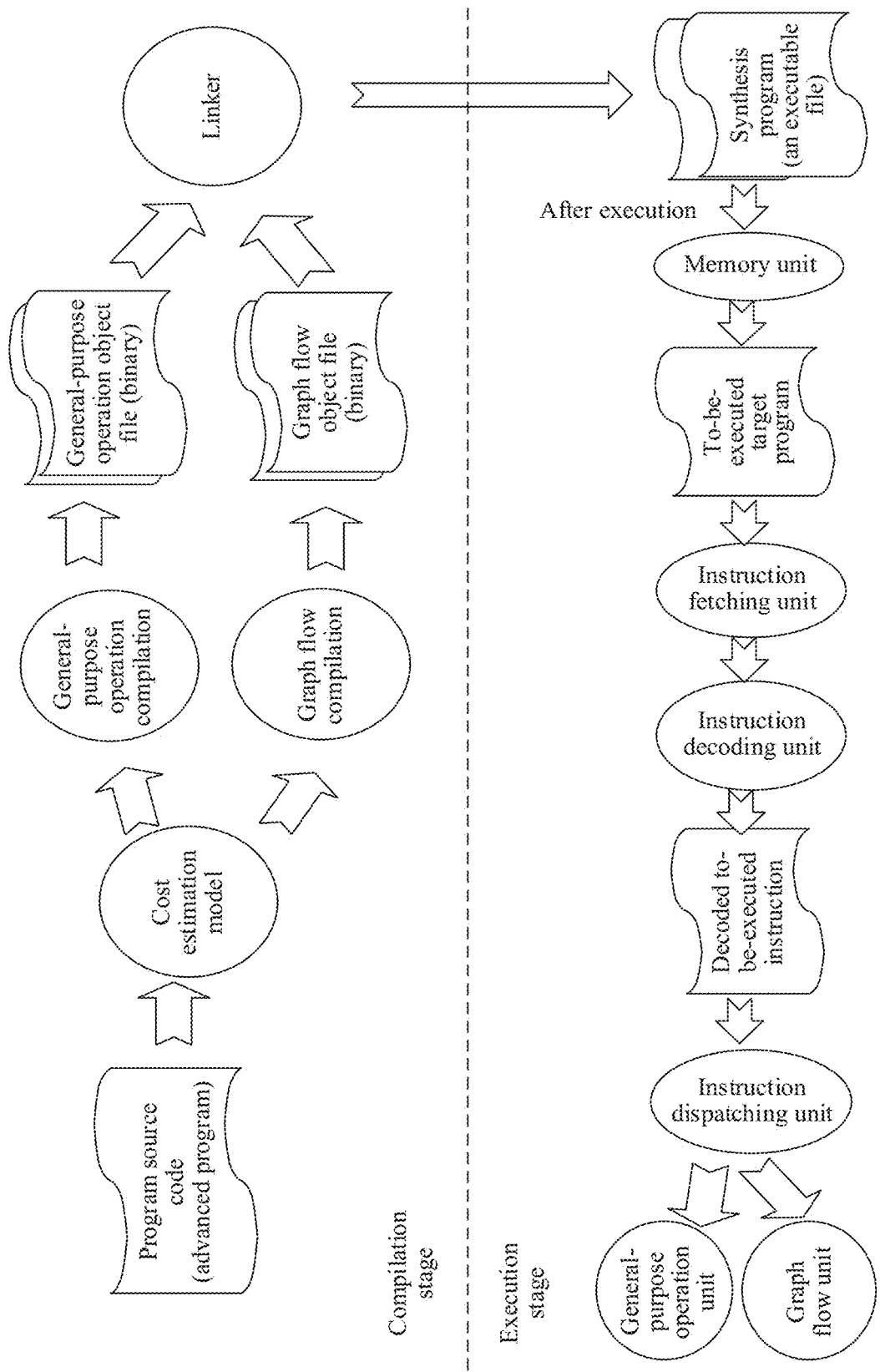
FIG. 4 is a schematic flowchart of comprehensive compilation and execution of source code according to an embodiment of the present application.

First, a process from compiling a target program to executing the target program in this application is described with reference to a structure and a function of the processor 10. FIG. 4 is a schematic flowchart of comprehensive compilation and execution of source code according to an embodiment of the present application.

1. Provide program source code written in high-level language, for example, source code written by a developer in various programming language (such as C language and JAVA).

2. Determine, based on a cost estimation model, a part of code that is in the source program and that is suitable for compiling in a general-purpose operation mode and a part of code that is suitable for compiling in a graph flow mode, to obtain a general-purpose operation object file or a graph flow object file (both are binary) through compilation in different compilation modes. For example, one application (Application, APP) may have millions of instructions, and a plurality of instructions are actually in an input-output relationship. For example, if an input condition for executing a specific instruction is an output result of another instruction, the two instructions may form basic elements (a vertex and an edge) in graph calculation. Therefore, at a source program compilation stage, a complex instruction sequence (for example, an instruction sequence with a relatively complex association relationship, indirect jump, or a relatively large quantity of interruptions) or an instruction sequence that is used only once may be compiled in the general-purpose operation mode based on the cost estimation model, and an instruction sequence that is suitable for repetition, such as a function that is cyclically or repeatedly invoked (whose association relationship may be complex or simple, but usually needs to be repeatedly executed), is compiled in the graph flow mode. Compilation in the graph flow mode means that logic involved between code is abstracted into a graph architecture, and in operations such as checking, jumping, and prediction that are originally performed by the processor, a binary machine instruction in the graph architecture is generated at the program compilation stage (that is, compiled by a compiler in the graph flow mode). Because instructions in the graph architecture include an input-output relationship of the instructions, when the GFU in the processor actually performs an operation, logical determining between the instructions can be significantly reduced, so that overheads in a CPU core are significantly reduced, performance is good, and power consumption is low.

3. Link (link) the compiled general-purpose operation object file and the compiled graph flow object file into a synthesis program (an executable file) by using a linker. For example, the object file is a .o file. When the program needs to executed, linking is further required. In a linking process, the object file (for example, the .o file) is mainly linked to a library to create an executable file. It may be understood that compilation stages corresponding to 1, 2, and 3 may be completed on a device (such as a server or a compiler) other than a device on which the processor 10 is located, may be completed through pre-compilation on the device on which the processor 10 is located, or may be simultaneously executed and compiled on the device on which the processor 10 is located. This is not specifically limited herein.

4. After the executable file is executed on the processor 10, the processor 10 loads a to-be-executed target program (such as a code segment, a data segment, a BSS segment, or a stack) in the executable file into the memory unit 1017 by using a series of operations such as instruction loading, instruction pre-fetching, instruction pre-decoding, and branch prediction.

5. The instruction fetching unit 1015 may obtain the target program from the memory unit 1017 in a manner of fetching one instruction each time for a plurality of consecutive times, so that each instruction enters the instruction decoding unit 1016 from the instruction fetching unit 1015 for decoding.

6. The instruction decoding unit 1016 splits and interprets the to-be-executed instruction based on a predetermined instruction format to further obtain a microoperation instruction, that is, the decoded to-be-executed instruction in this application, and sends the microoperation instruction to the instruction dispatching unit 1011.

7. After receiving the decoded to-be-executed instruction, the instruction dispatching unit 1011 distributes the decoded to-be-executed instruction to each execution unit (Execution Unit) for calculation based on a type of each instruction. For example, the decoded to-be-executed instruction is dispatched to the general-purpose operation unit 1013 or the graph flow unit 1012 for calculation. Because the graph flow unit 1012 is disposed in the processor core 101 of the processor 10, the instruction dispatching unit 1011 may be directly connected to and communicate with the graph flow unit 1012, so that the identified graph calculation control instruction is directly dispatched to the graph flow unit 1012, and communication is performed without using another message channel or a load/store manner, so that a communication delay is significantly reduced. In a possible implementation, the general-purpose calculation instruction and the graph calculation control instruction in this application may be identified by using different flag bits (the flag bit may be added at the foregoing compilation stage); in other words, instructions of different types may correspond to different instruction IDs, so that the instruction dispatching unit 1011 may perform identification based on the instruction IDs.

8. The graph flow unit 1012 receives and executes the graph calculation station control instruction to obtain an execution result of the graph calculation task. One or more general-purpose operation units 1013 receive and execute the general-purpose calculation instruction to obtain an execution result of the general-purpose calculation task. Optionally, the graph flow unit 1012 and the general-purpose operation unit 1013 may execute instructions in parallel or in series, and this depends on a logical relationship between instructions executed by these execution units in the target program. This is not specifically limited in this embodiment of the present application.

9. Finally, both the graph flow unit 1012 and the general-purpose operation unit 1013 may send a calculation result to the result write-back unit 1014, and the result write-back unit 1014 may feed back some or all calculation results to the instruction dispatching unit 1011. For example, the calculation result is used as a parameter in an instruction subsequently dispatched by the instruction dispatching unit 1011. Optionally, the first execution result or the second execution result may be directly written into the memory unit 1017, or may be written into the memory unit 1017 by using the load/store unit 1013A, so that a related execution unit (for example, the graph flow unit 1012 or the load/store unit 1013A) may obtain a required parameter from a corresponding storage location. Because the graph flow unit 1012 is disposed in the processor core 101 of the processor 10, the processor core 101 has a right and a condition to obtain related calculation statuses (for example, the first execution result and the second execution result) of the graph flow unit 1012 and the another general-purpose operation unit 1013, to control synchronous or asynchronous running of the graph flow unit 1012 and another operation unit, so that running efficiency of the processor is improved.

In conclusion, similar to another general-purpose operation unit, the graph flow unit 1012 receives live in (liveIn) data on a register that is sent from the instruction dispatching unit 1011 (for example, including an instruction issuing and reservation station), and transmits the input to a corresponding calculation node of the graph flow unit 1012. Similarly, the graph flow unit 1012 also writes love out (liveOut) output data back to the result write-back unit 1014 (such as a register and a reorder buffer (Reorder Buffer)), to write a graph output into a corresponding register and an instruction reservation station that depend on the graph output.

Figure 5:
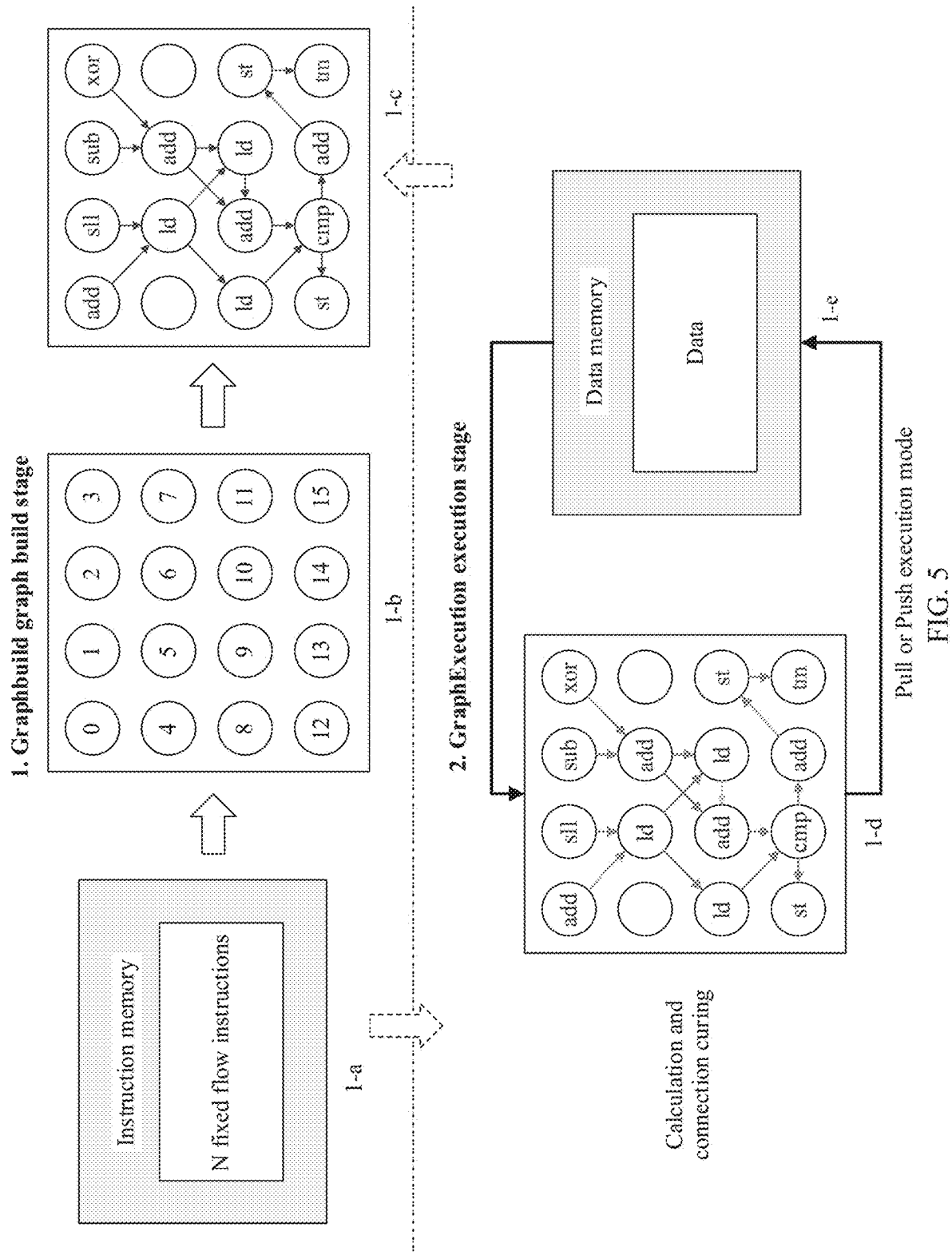
FIG. 5 is a schematic diagram of a calculation model of a graph flow unit according to an embodiment of the present application.

Then, a calculation model at the execution stage that is used by the graph flow unit to perform graph calculation is further described. FIG. 5 is a schematic diagram of a calculation model of a graph flow unit according to an embodiment of the present application.

A theoretical calculation model of a graph flow (Graph flow) in this application may be abstracted into N fully connected calculation nodes (corresponding to vertices of a graph). One instruction may be placed on each node for one operation, and a result may be transmitted to the node or another node. The theoretical calculation model of the graph flow may be divided into two stages that are repeatedly switched.

1. Graph build (Graph Build) stage: N instructions of a graph build block are read from an instruction memory (1-*a* in FIG. 5), and one operation instruction and a maximum of two target nodes are configured for each node in the graph build block (1-*b* in FIG. 5). It is assumed that when N is equal 16, there are a total of 16 calculation nodes in 1-*b* in FIG. 1: 0, 1, 2, 3, 4, . . . , 15. Once a graph is built (1-*b* in FIG. 5), an operation and a connection of each node are cured (the node is read-only). For example, an operation instruction in the calculation node 0 is an add instruction, that is, an addition operation; an operation instruction in the calculation node 2 is an sll instruction, that is, a shift operation: and an operation instruction in the calculation node 3 is an xor instruction, that is, an exclusive OR operation. The calculation node 1 and an operation result of the calculation node 1 are used as an input of the calculation node 5, to perform an Id operation (that is, an instruction fetch operation); an operation result of the calculation node 2 and an operation result of the calculation node 3 are used as an input of the calculation node 6, to perform an add operation (that is, an addition operation); and so on. An operation process of another calculation node is not described.

2. Execute stage (Graph Execute): An external module transmits an input (LiveIn) to start a data flow. All calculation nodes run in parallel. For each node (1-*d* in FIG. 5), an operation may be performed provided that an input of the node arrives, and a result is transmitted to a next calculation node. The node is in an idle state if the input has not arrived. Running continues until a data flow reaches an end node (tm) Because input parameters of some calculation nodes (for example, the calculation nodes 0, 1, 2, and 3) are input externally, that is, start data needs to be input from the external memory unit 1017 (1-*e* in FIG. 5), and some other calculation nodes (for example, the calculation nodes 5, 6, 8, 9, 10, 11, 12, 13, 14, and 15) need to obtain, from an internal part, calculation results output by calculation nodes that are in a connection relationship with the calculation nodes, so that an operation may be performed, and an operation result is input into the calculation nodes that are associated with the calculation nodes.

Based on the foregoing calculation model of graph flow provided in this application, when the instruction dispatching unit 1011 in the processor 10 dispatches the graph calculation control instruction to a controller in the graph flow unit 1012 to execute the graph calculation task, control instructions of different functions are included, to instruct the graph flow unit 1012 to perform a corresponding graph calculation function. In time sequence, the graph calculation control instruction provided in this application mainly includes a graph build start instruction→a parameter pass instruction→a graph calculation start instruction→a parameter return instruction. Features and functions of the foregoing instructions are specifically described below.

In a possible implementation, the processor 10 further includes a memory unit 1017. The graph flow unit 1012 includes N calculation nodes. The graph calculation control instruction includes a graph build start instruction, and the graph build start instruction carries a target address in the memory unit 1017. The graph flow unit 1012 receives the graph build start instruction, and reads graph build block information from the memory unit 1017 based on the target address. The graph build block information includes an operation method of each of the N calculation nodes and connection and sequence information of the N calculation nodes. In this embodiment of the present application, if the graph calculation control instruction received by the graph flow unit is specifically the graph build start instruction, the instruction is used to instruct the graph flow unit to read, based on the target address that is in the memory unit 1017 outside the processor core 101 and that is carried in the instruction, the graph build block information stored in the memory unit. The graph build block information includes a corresponding operation method of each of the N calculation nodes in the graph flow unit and a dependency between the N calculation nodes, that is, a relationship between a calculation result and an input condition of calculation nodes in an association relationship (that is, two calculation nodes corresponding to edges during graph calculation), that is, corresponding to N fixed flow instructions in the graph calculation model in FIG. 5. The graph flow unit 1012 may complete calculation of a complete graph build block based on the foregoing graph build block information. It should be noted that one graph build block may be one graph build block or all graph build blocks during graph calculation; in other words, one complete graph calculation task may include one graph build block or a plurality of graph build blocks that are obtained through splitting.

Figure 6A:
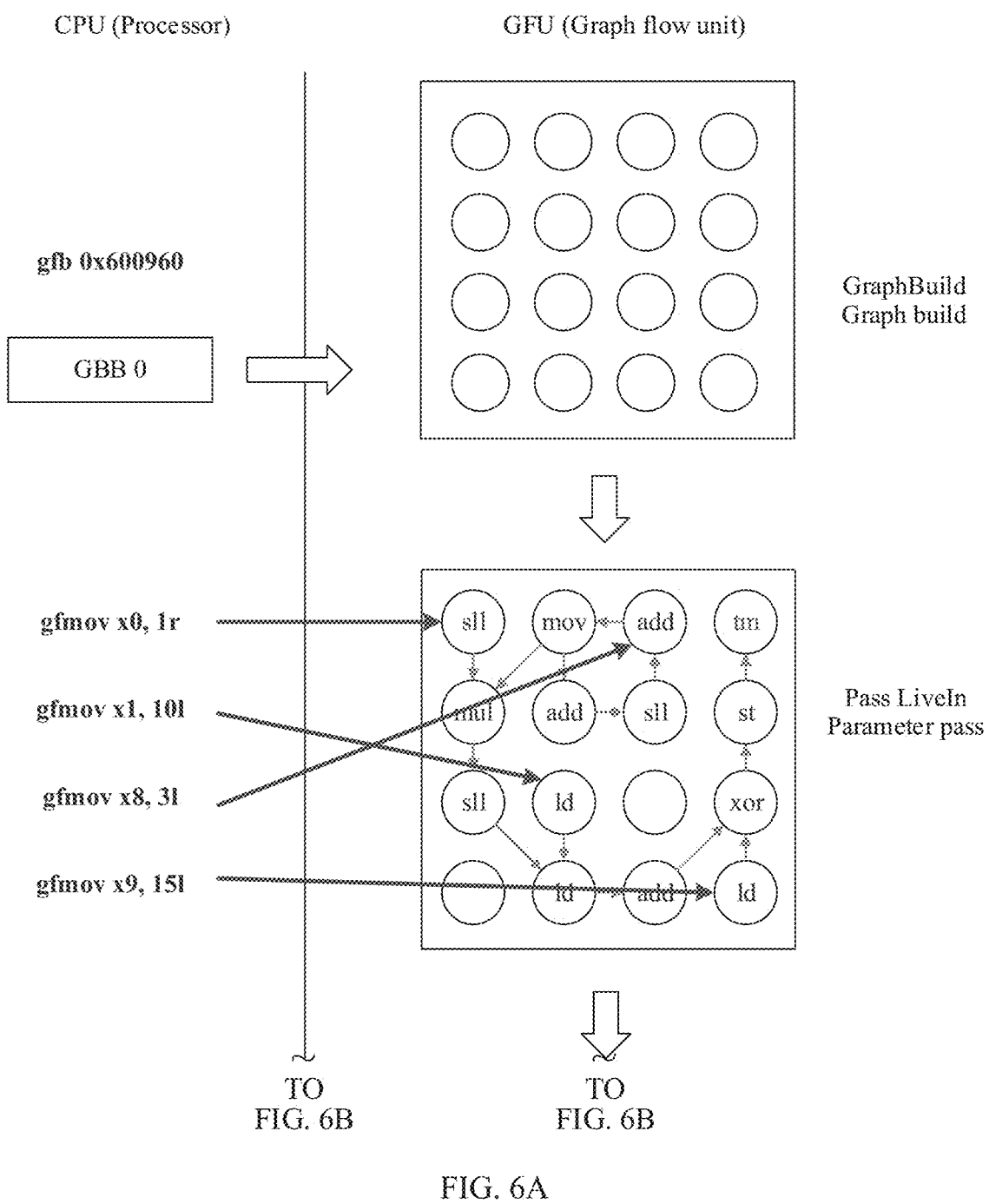
FIG. 6A and FIG. 6B are a schematic diagram of a graph flow control instruction according to an embodiment of the present application.
Figure 6B:
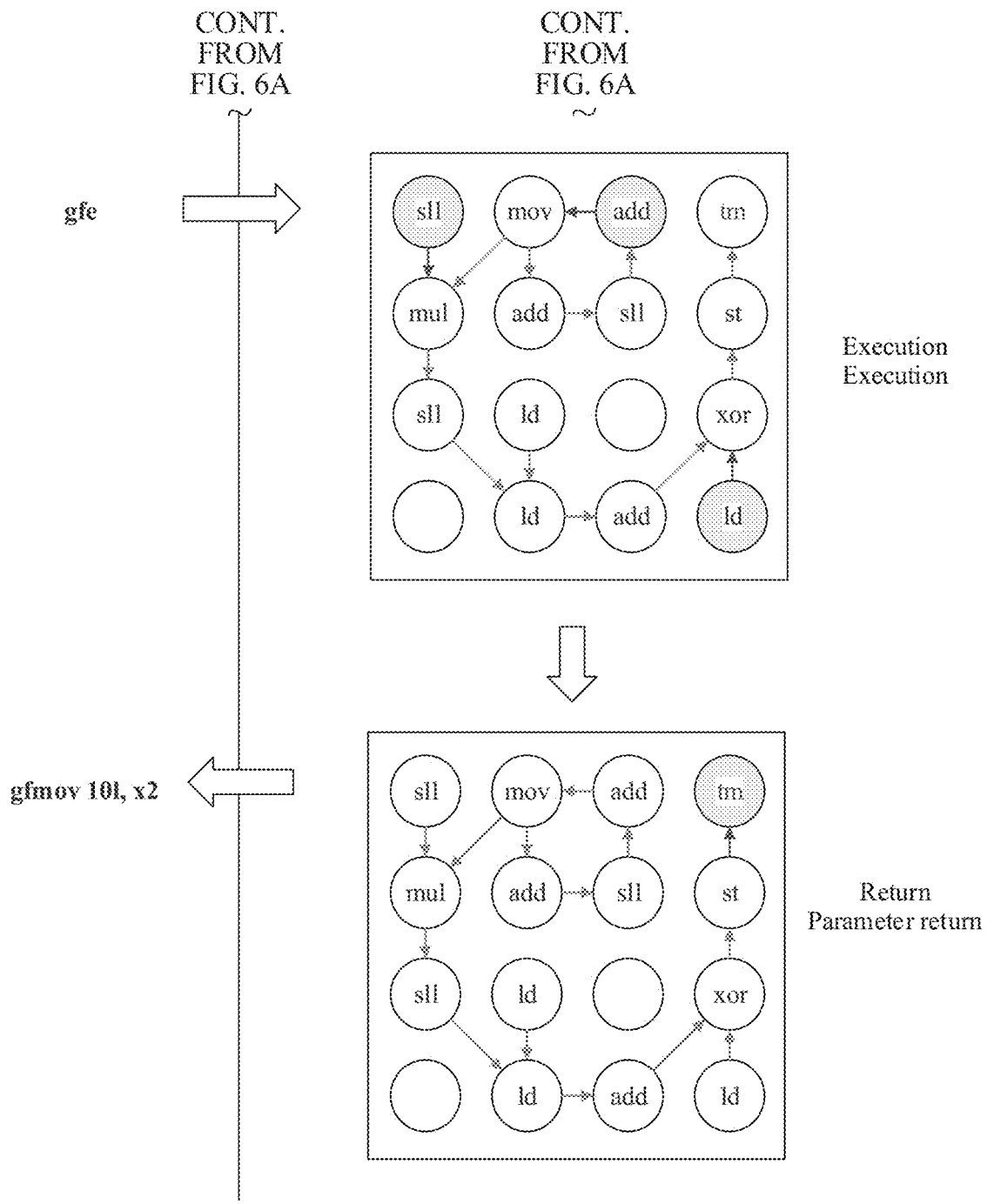

For example, FIG. 6A and FIG. 6B are a schematic diagram of a graph flow control instruction according to an embodiment of the present application. The graph build start instruction is gfb 0x600960, where gfb is operation code. 0x600960 is an operand and is an address in the memory unit 1017. The graph flow unit 1012 may obtain, according to the graph build start instruction, graph build block information corresponding to the address 0x600960 from the memory unit 1012, to start graph building. In other words, the instruction dispatching unit 1011 sends, to the graph flow unit 1012, a pointer of an address at which a related graph calculation instruction that needs to be executed by the instruction dispatching unit 1011 is located, and reads a graph build information block from the memory unit 1017.

In a possible implementation, the graph calculation control instruction includes a parameter pass instruction, the parameter pass instruction carries identifiers of M calculation nodes and input parameters separately corresponding to the identifiers of the M calculation nodes, and the M calculation nodes are some or all nodes in the N nodes. The graph flow unit is configured to: receive the parameter pass instruction, and separately input the input parameters separately corresponding to the identifiers of the M calculation nodes into the M calculation nodes.

For example, as shown in FIG. 6A and FIG. 6B, the parameter pass instruction includes: gfmov x0, 1*r* which means that a parameter value in a register x0 is used as a right input parameter in the calculation node 1: gfmovx1. 10I which means that a parameter value in a register x1 is used as a left input parameter in the calculation node 10; and so on. This is not listed one by one herein. In this embodiment of the present application, if the graph calculation control instruction received by the graph flow unit includes the parameter pass instruction, and the parameter pass instruction includes initial input parameters required by a plurality of calculation nodes (for example, the calculation nodes 0, 1, 2, and 3 in FIG. 5) in one graph build block calculation process, after the plurality of calculation nodes obtain the corresponding parameters from the outside of the graph flow unit, the graph flow unit meets a condition of starting to execute the graph calculation task, that is, may start to perform graph calculation.

In a possible implementation, the graph calculation control instruction includes a graph calculation start instruction. After receiving the graph calculation start instruction, the graph flow unit 1012 determines whether current graph building is completed: and if current graph building is completed, the graph flow unit 1012 starts to execute the graph calculation task. Specifically, in a possible implementation, after receiving the graph calculation start instruction, the graph flow unit 1012 checks whether the graph build block information read by the graph flow unit is consistent with an address of a pre-started graph build block, determines whether the input parameters of the M calculation nodes are input, and starts to execute the graph calculation task if the graph build block information read by the graph flow unit is consistent with the address of the pre-started graph build block and inputting is completed.

Further, that the processor 10 controls, by using the graph calculation start instruction, the graph flow unit 1012 to start to execute the graph calculation task specifically includes the following two control manners:

Manner 1: Synchronously Start Parallel Graph Calculation

After receiving the graph calculation start instruction, the graph flow unit 1012 determines whether current graph building is completed, and if the current graph building completed, starts to execute the graph calculation task. Further, after the graph flow unit 1012 receives the graph calculation start instruction and before the graph calculation task is completed, the instruction dispatching unit 1011 controls the processor core 101 to enter a blocking state, and controls, after the graph flow unit 1012 completes the graph calculation task, the processor core 101 to exit the blocking state.

Specifically, the processor 10 may start an execute stage of the graph flow unit 1012 by using a gfe (graph flow execute) instruction. If graph building of the graph flow unit 1012 is not completed, the gfe starts execution of the graph flow unit 1012 only after the graph building is completed. At the execute stage of the graph flow unit 1012, another unit of the processor core 101 is at a power gate (Power Gate) stage without performing another operation, and the only running unit is an interruption and exception unit of the processor core 101. Therefore, the processor core 101 enters a blocking (blocking) state after executing the gfe. If the graph building is incorrect or the execution is incorrect, a corresponding exception of the gfe is generated. A CPU instruction after the gfe may not continue to be executed until the graph flow unit 1012 completes execution, including a parameter return instruction gfmov.

For example, as shown in FIG. 6A and FIG. 6B, at a graph calculation execute stage, the graph flow unit 1012 is triggered, by starting a graph calculation start instruction gflow <GBB_address>, to check whether graph building of the GFU is completed and whether an address <GBB_address> of a previously started graph build block is consistent with that of an executed graph build block. If graphs built by the graph build blocks are inconsistent, a graph build unit needs to be restarted to build a graph again. If the built graphs are consistent, graph calculation may be started immediately. Optionally, the instruction may block a pipeline of the processor core 101 until entire graph calculation is completed. Therefore, another operation unit of the processor core 101 cannot operate an instruction after the gflow instruction. The instruction may be used for switching between the general-purpose operation mode and the graph calculation mode. The instruction may also be used by the processor by using only the GFU to reduce energy consumption. In a graph calculation process, a data flow and a control flow in the graph flow downward based on a program definition. After the graph flows to an end node gfterm of the graph, an operation of graph calculation ends. The gfterm starts a processor instruction gflow to enter a commit stage, and restarts the pipeline of the processor core 101.

In this embodiment of the present application, the processor core may enable a graph calculation function in a synchronous manner (in other words, the graph flow unit and another general-purpose operation unit may execute tasks in series). In other words, when the graph flow unit executes the graph calculation task, the pipeline of the processor core is blocked, and the graph flow unit does not exit the blocking state until the graph flow unit completes the graph calculation task, to ensure that in this period, only the graph flow unit is performing an operation, but another operation unit cannot perform an operation. In this way, power consumption of the CPU is reduced. The instruction may implement switching of a calculation mode between another operation unit in the processor and the graph flow unit, and may be applied to synchronously operated programs.

Manner 2: Asynchronously Start Parallel Graph Calculation

After receiving the graph calculation start instruction, the graph flow unit 1012 determines whether current graph building is completed, and if the current graph building completed, starts to execute the graph calculation task. Further, the instruction dispatching unit 1011 further sends an execution result synchronization instruction to the graph flow unit 1012, controls, after the graph flow unit 1012 receives the execution result synchronization instruction and before the graph calculation task is completed, the processor core 101 to enter a blocking state, and controls, after the graph flow unit 1011 completes the graph calculation task, the processor core 101 to exit the blocking state.

Specifically, the processor 10 may start an asynchronous execution stage of the graph flow unit 1012 by using a gff (graph flow fork) instruction. If graph building of the graph flow unit 1012 is not completed, the gff starts execution of the graph flow unit 1012 after the graph building is completed. When the gff starts execution of the graph flow unit 1012, another operation unit of the processor core 101 may perform another operation. Therefore, the gff does not occupy a resource in a ROB. After asynchronous execution, the processor synchronizes an execution result of the graph flow unit 1012 by using a gfj (graph flow join) instruction. A CPU instruction after the gfj can continue to be executed only after execution of Graphflow is completed, including gfmov of a parameter return instruction.

For example, in this embodiment of the present application, two new CPU instructions are added to an instruction set to start parallel operations of the GFU and another operation unit of the processor core 101, including an instruction gfork <GBB_address> and an instruction gfjoin <GBB_address>. In the gffork instruction, whether graph building of the GFU is completed and whether an address <GBB_address> of a pre-started graph build block is consistent with that of an executed graph build block are checked first. If graphs built by the graph build blocks are inconsistent, a graph build unit needs to be restarted to build a graph again. If the built graphs are consistent, graph calculation may be started immediately. The gffork instruction does not block a pipeline of the CPU. Therefore, another module of the CPU and graph calculation may be asynchronously executed. The gfjoin is executed before the CPU instruction requires an operation result of graph calculation. If an operation of graph calculation has already been completed, the gfjoin is returned immediately. If graph calculation still has not been completed, the gfjoin blocks the pipeline of the CPU until graph calculation is completed.

In this embodiment of the present application, the processor core may enable a graph calculation function in an asynchronous manner (in other words, the graph flow unit and another general-purpose operation unit may execute tasks in parallel). In other words, when the graph flow unit executes the graph calculation task, a pipeline of the processor core is not blocked, and another operation unit can run normally. When the processor sends the execution result synchronization instruction to the graph flow unit by using the instruction dispatching unit (for example, when an operation of the another operation unit requires participation of an execution result of the graph flow unit), if the graph flow unit has not completed the graph calculation task in this case, the pipeline of the processor starts to be blocked, and the processor core exits the blocking state only after the graph flow unit completes the graph calculation task and feeds back the execution result, to ensure that when the another operation unit needs the execution result of the graph flow unit, the another operation unit may continue execution when the graph flow unit feeds back the execution result. In this way, a degree of parallelism of the processor core is improved. The instruction may implement a calculation mode in which the another operation unit in the processor and the graph flow unit are parallel, and may be applied to asynchronously operated programs.

In addition to the foregoing manner of controlling, by using the graph calculation control instruction, the graph flow unit 1012 to start graph calculation, an embodiment of the present application further provides an implementation in which graph calculation is triggered and started by using determining of the graph flow unit 1012. Specifically, if the graph build block information includes an operation method of each of the N calculation nodes and connection and sequence information of the N calculation nodes, and the connection and sequence information of the N calculation nodes includes source nodes and destination nodes that are separately corresponding to L edges, the graph flow unit 1012 monitors whether an input parameter required by each of the N calculation nodes is ready, inputs an input parameter of a target calculation node whose input parameter is ready into an operation method corresponding to the target calculation node for calculation, to obtain a calculation result, and inputs a calculation result of a source node on each edge into a corresponding destination node as an input parameter based on the source nodes and the destination nodes that are separately corresponding to the Ledges. The graph includes a plurality of nodes and edges connecting the nodes, and one edge includes a source node and a destination node that form the edge and an association relationship between the source node and the destination node. Therefore, in the graph architecture in this application, programs of a data flow and a control flow are abstracted into a graph including N nodes, and a connection between nodes represents a data flow (Dataflow) or a control flow (ControlFlow). Each node is used as one graph instruction. Once an input required by a specific graph instruction is ready, the current instruction may be operated, and a result may be transmitted to a corresponding input of a next instruction.

Figure 7:
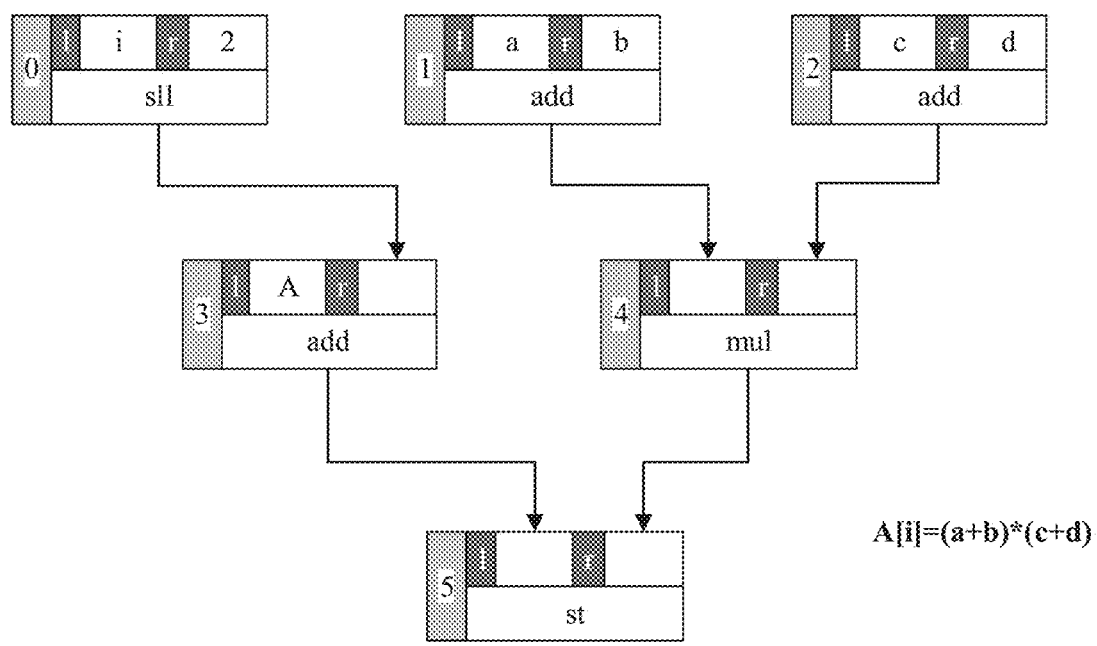
FIG. 7 is a schematic diagram of an abstract model of a calculation node in a graph build block according to an embodiment of the present application.

For example. FIG. 7 is a schematic diagram of an abstract model of a calculation node in a graph build block according to an embodiment of the present application. It is assumed that inputs required by each graph instruction are a left input (l), a right input (r), and a conditional input (p). Once the inputs required by the instruction are ready, an operation may be performed, and an operation result is transmitted to an input of a succeeding corresponding node. For example, after an add operation a+b in an instruction 1 ends, an operation result may be sent to a left input of an instruction 4. A graph architecture instruction set in this application may be represented as "1add 4l", and this means that for the instruction 1, a result is transmitted to the left input of the instruction 4 once an input of the instruction 1 is ready. In the graph architecture instruction set, only an output address needs to be provided in this application, and input information of an instruction does not need to be provided. For the input, it only needs to be ensured that one or more instructions are transmitted to an input of each instruction. Therefore, after encoding is performed by using the graph architecture instruction set in this application, a graph calculation process is simpler and faster.

It can be learned from FIG. 7 that a degree of parallelism between instructions is obvious. Instructions without dependency can run naturally and concurrently. For example, an instruction 0, the instruction 1, and an instruction 2 are one clock cycle, and an instruction 3 and the instruction 4 are one clock cycle. In hardware implementation (that is, the graph flow unit), only a ready bit and a valid bit of each input need to be checked in the calculation process to implement check of a dependency. Compared with a superscalar processor in the conventional technology, the graph calculation process in this application does not require a large amount of hardware to check a dependency between registers.

Optionally, it is assumed that one graph includes N nodes, ideal hardware required for executing the graph is that each node has an operation unit, that is, a calculation node (Process Engine, PE) in this application, and a result may be transmitted to a corresponding next-level (level) calculation node in a next clock cycle by using an ideal N-to-N crossbar (Crossbar). However, when N is extremely large, it is difficult to implement the N-N crossbar. Therefore, in a practical hardware design, in a possible implementation, in this embodiment of the present application, P instructions are defined to share X calculation nodes. In other words, on one calculation node, a maximum of X instructions (an instruction whose input needs to be ready) are selected from P instructions in each clock cycle for simultaneous operations.

In this embodiment of the present application, each calculation node in the graph flow unit may start to perform graph calculation provided that an operation method of the calculation node is loaded and an input parameter of the calculation node is obtained. However, some calculation nodes (for example, source nodes corresponding to edges) obtain initial input parameters from the outside of the graph flow unit, and some other calculation nodes (for example, destination nodes corresponding to edges) may need to wait for completion of calculation of calculation nodes (for example, source nodes) in an association relationship with the calculation nodes before using calculation results of the calculation nodes as input parameters of the calculation nodes to start graph calculation. Therefore, calculation start time of calculation nodes may be inconsistent. However, each calculation node may start an operation after an operation method and an input parameter (which may include a left input parameter, a right input parameter, or a conditional parameter) are ready.

In a possible implementation, the processor core 101 further includes a result write-back unit. FIG. The graph flow unit 1012 and the at least one general-purpose operation unit are separately connected to the result write-back unit 1014. The graph calculation control instruction includes a parameter return instruction, and the parameter return instruction carries identifiers of K calculation nodes and result registers separately corresponding to the identifiers of the K calculation nodes. The graph flow unit 1012 is specifically configured to control to separately send calculation results of the K calculation nodes to the result write-back unit 1014. In this embodiment of the present application, for the N calculation nodes of the graph flow unit, after completing final calculation, some calculation nodes may need to output calculation results to the result write-back unit outside the graph flow unit; in other words, the graph flow unit may control, based on the identifiers that are of the K calculation nodes and that are carried in the parameter return instruction in the received graph calculation control instruction, to use final calculation results of the K calculation nodes as a calculation result of an entire graph build block, and output the calculation result to the result write-back unit outside the graph flow unit, so that a subsequent execution unit performs further calculation.

Optionally, the result write-back unit 1014 specifically includes a reorder buffer (ReorderBuffer) that is configured to store an instruction execution sequence before out-of-order execution. When an instruction set is executed in an out-of-order manner, a result is submitted based on an original instruction sequence. Further optionally, the result write-back unit 1014 further includes a register group, such as a general-purpose register and a dedicated register. A general-purpose register group is used to store an operand participating in an operation and an intermediate result. The dedicated register is usually a status register, and cannot be changed by using a program and is controlled by the processor to indicate a specific state.

The general-purpose operation unit 1013 in the processor 10 in this application may include a plurality of types of hardware execution units for execution or acceleration of different types of calculation tasks. The processor may mainly include one or more of a load/store unit 1013A (LSU), a floating point unit 1013D (FPU), a vector operation unit 1013C (SIMD), and an arithmetic logical unit 1013D (ALU). Features and functions of the general-purpose operation unit are specifically described below.

In a possible implementation, the general-purpose operation instruction includes a general-purpose arithmetic logical instruction or a load/store instruction. The at least one general-purpose operation unit includes an arithmetic logical unit 1013D (ALU), configured to: receive a general-purpose arithmetic logical instruction sent by the instruction dispatching unit 1011, and perform a logical operation; or a load/store unit 1013A (LSU), configured to receive a load/store instruction sent by the instruction dispatching unit 1011, and perform a load/store operation.

The arithmetic logical unit (Arithmetic and Logical unit, ALU) mainly implements a fixed-point arithmetic operation (plus/minus/multiplication/division), a logical operation (AND or non-exclusive OR), and a shift operation on binary data. Instructions of mathematical operations such as addition, subtraction, multiplication, and division and logical operations such as "OR, AND, ASL, and ROL" are executed in the logical operation unit. The arithmetic logical unit affects operations in the processor such as compression and decompression, computer progress scheduling, compiler syntax analysis, computer circuit auxiliary design, and game AI processing.

The load/store unit (Load Store Unit, LSU) is used to calculate an address. For an instruction (generally means load/store) of a memory access type, a memory address to be used by the instruction is carried in the instruction. The LSU is responsible for processing the instruction and calculating the address carried in the instruction. A single LSU is used to calculate an address of a memory-type instruction, so that the LSU and another execution unit can execute instructions in parallel, so that execution efficiency of the instruction of the memory access type is improved, and performance of the processor is improved.

In this embodiment of the present application, the at least one operation unit may further include the arithmetic logical unit 1013D and the load/store unit. The logical operation unit is mainly configured to perform a related logical operation, and the load/store unit is configured to execute a data read/write operation instruction. In other words, the foregoing units and the graph flow unit are at an execute pipeline stage, and jointly complete calculation tasks of various types after decoding in the CPU, and the calculation tasks may be executed in parallel or in series, or may be partially executed in parallel and partially executed in series, to more efficiently complete a calculation task of the processor. In this embodiment of the present application, a directed graph flow architecture (Graphflow) is embedded into the superscalar central processing unit as a module, and an existing operation unit in a superscalar processor core is multiplexed to achieve better performance and lower energy consumption.

In a possible implementation, the graph calculation control instruction includes a data read/write instruction, and the data read/write instruction carries a read/write address in the load/store unit 1013A. The graph flow unit 1012 is further configured to read data from the load/store unit 1013A (LSU) or write data into the load/store unit 1013A (LSU) based on the load/store address in the data read/write instruction. For example, the graph flow unit 1011 may read, from the load/store unit 1013A (LSU) by using a related load (Load) instruction or a store (Store) instruction, an instruction, a parameter, or the like required for graph calculation, or write an execution result of graph calculation into the load/store unit 1013A (LSU). Different operations may be performed based on specific instruction content in the target program. It may be understood that the data read from the load/store unit 1013A (LSU) is actually data read from the memory unit 1017 by the load/store unit 1013A. The data written into the load/store unit 1013A (LSU) is actually data written into the memory unit 1017 from the load/store unit 1013A after being written into the load/store unit 1013A.

Optionally, the graph flow unit 1011 may further directly read data from the memory unit 1017 according to the graph calculation control instruction, or directly write an execution result into the memory unit 1017, and this depends on a specific instruction in the to-be-executed target program. In other words, the graph flow unit 1011 may obtain data from the load/store unit 1013A according to the graph calculation control instruction, and may also obtain data from the memory unit 1017; and similarly, may write data into the load/store unit 1013A according to the graph calculation control instruction, and may also write data into the memory unit 1017.

In this embodiment of the present application, the graph flow unit in the processor core 101 may multiplex a function of the load/store unit in the processor core 101, and read data from or write data into the load/store unit LSU based on a read/write address in a related data read/write instruction.

In a possible implementation, the at least one general-purpose operation unit further includes a floating point unit FPU or a vector operation unit 1013C (SIMD). The graph calculation task includes a floating point operation or a vector operation. The graph flow unit 1012 is further configured to: send data of the floating point operation to the floating point unit FPU for calculation, and receive a calculation result fed back by the FPU; or send data of the vector operation to the vector operation unit 1013C (SIMD) for calculation, and receive a calculation result fed back by the SIMD.

The floating point unit 1013B (Floating Point Unit, FPU) is mainly responsible for a floating point operation and a high-precision integer operation. A floating point operation capability is an important index related to a multimedia-related application, audio/video encoding and decoding, and image processing/3D graphics processing of the CPU, and also affects scientific calculation performance such as hydrodynamics and quantum mechanics of the CPU.

Single instruction multiple data (Single Instruction Multiple Data, SIMD) may also be referred to as a vector operation unit 1013C, and is a technology for implementing data-level parallelism. The vector operation unit 1013C simultaneously performs a plurality of operations in a single instruction, to increase a throughput of the processor. In other words, one vector instruction is used to start one group of data operations, and data loading, storage, and data calculation are performed in a pipeline form. This is applicable to an application scenario in which there are a large quantity of fine-grained, homogeneous, and independent data operations, such as multimedia, big data, and artificial intelligence.

Based on the foregoing descriptions, in other words, load/store of the graph flow unit 1012 (GFU) may multiplex the load/store unit 1013A (LSU) in the processor 10, and a floating point operation and a complex vector operation multiplex operation logic of the FPU and the SIMD. In this way, calculation logic inside the GFU is prevented from being repeatedly implemented, a large quantity of hardware areas are reduced, and a delay of switching from a common operation to a graph operation is reduced.

In this embodiment of the present application, the general-purpose operation unit in this embodiment of the present application may further include the floating point unit FPU and/or the vector operation unit 1013C (SIMD). The floating point unit is configured to perform a floating point operation task that requires higher data precision, and the vector operation unit 1013C may be configured to perform a single instruction multiple data operation. In addition, both the general-purpose operation unit (including some dedicated operation units) and the graph flow unit are at an execute pipeline stage, and there is a data transmission channel between the general-purpose operation unit and the graph flow unit. Therefore, in a process of processing the graph calculation task, if there is a calculation task related to a floating point operation or a single instruction multiple data calculation task, the graph flow unit may send the calculation task to a corresponding general-purpose operation unit for an operation through the corresponding data transmission channel, and there is no need to repeatedly dispose a corresponding processing unit in the graph flow unit to process a corresponding type of operation task. Therefore, a hardware area and overheads are significantly reduced.

Based on the foregoing structure and function design of the processor in this application and a theoretical calculation model of Graphflow, in a possible implementation, a basic format of a flow instruction in a graph flow instruction set (Graphflow Instruction-Set Architecture, Graphflow ISA) is further defined in this application, that is, an operation method of each of the N calculation nodes included in the graph build block information in this application and connection and sequence information of the N calculation nodes. A format of one execution instruction executed by a single calculation node may be represented as follows: [ID+opcode+dest0ID+dest1ID].

Figure 8:
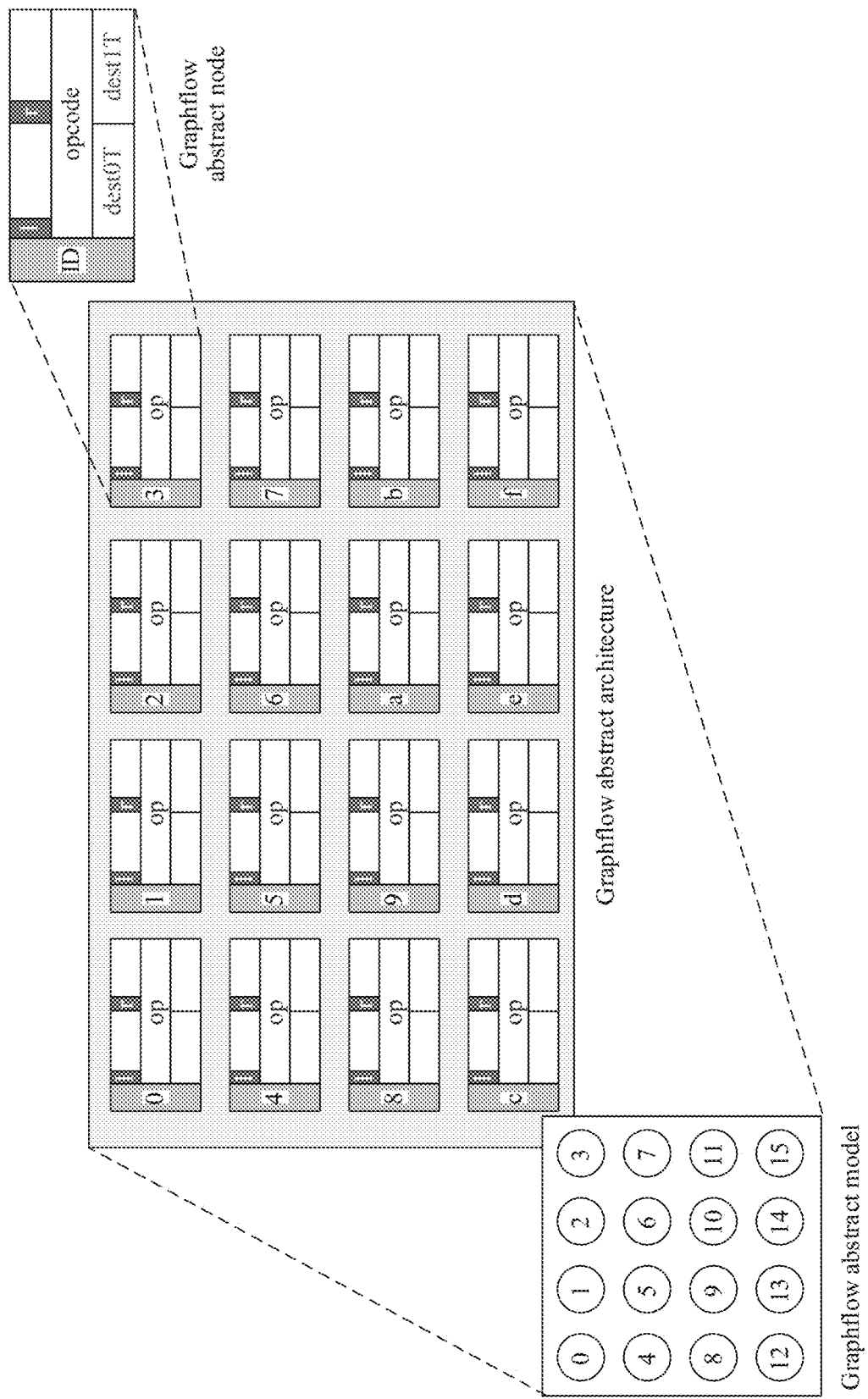
FIG. 8 shows an abstract model of a graph flow instruction according to an embodiment of the present application.

FIG. 8 shows an abstract model of a graph flow instruction according to an embodiment of the present application. An ID-based flow instruction is placed on a calculation node whose corresponding sequence number is an ID. An ID range is [0, N−1], and N is a total quantity of nodes in the Graphflow. One flow instruction may express one or two dependencies, and indicate that result data is transmitted to dest0ID and dest1ID.

For better understanding of the graph architecture in this application, in this application, each calculation node of the Graphflow is abstracted as shown in FIG. 8. One instruction and a maximum of two outputs may be placed on each abstract calculation node. Each calculation node has a left input (l) buffer and a right input (r) buffer, an operand (opcode), and two target pointers (dest0T and dest1T, where T represent left and right inputs of a target instruction). Because it is assumed that N nodes are fully connected, a range of dest is [0, N−1], and therefore represents a left input (l) buffer and a right input (r) buffer of any node that an output of the node may point to.

A (opcode, dest0T, dest1T) bit in an abstract node may be written at a graph build stage, but is cured as read-only at an execute stage. Once entering the execute stage, all nodes need to check, in parallel, whether left and right inputs arrive. If both inputs are ready, an operation can be performed and a result is transmitted to left and right outputs of a next node. The node is in an idle state if the input has not arrived.

Figure 9:
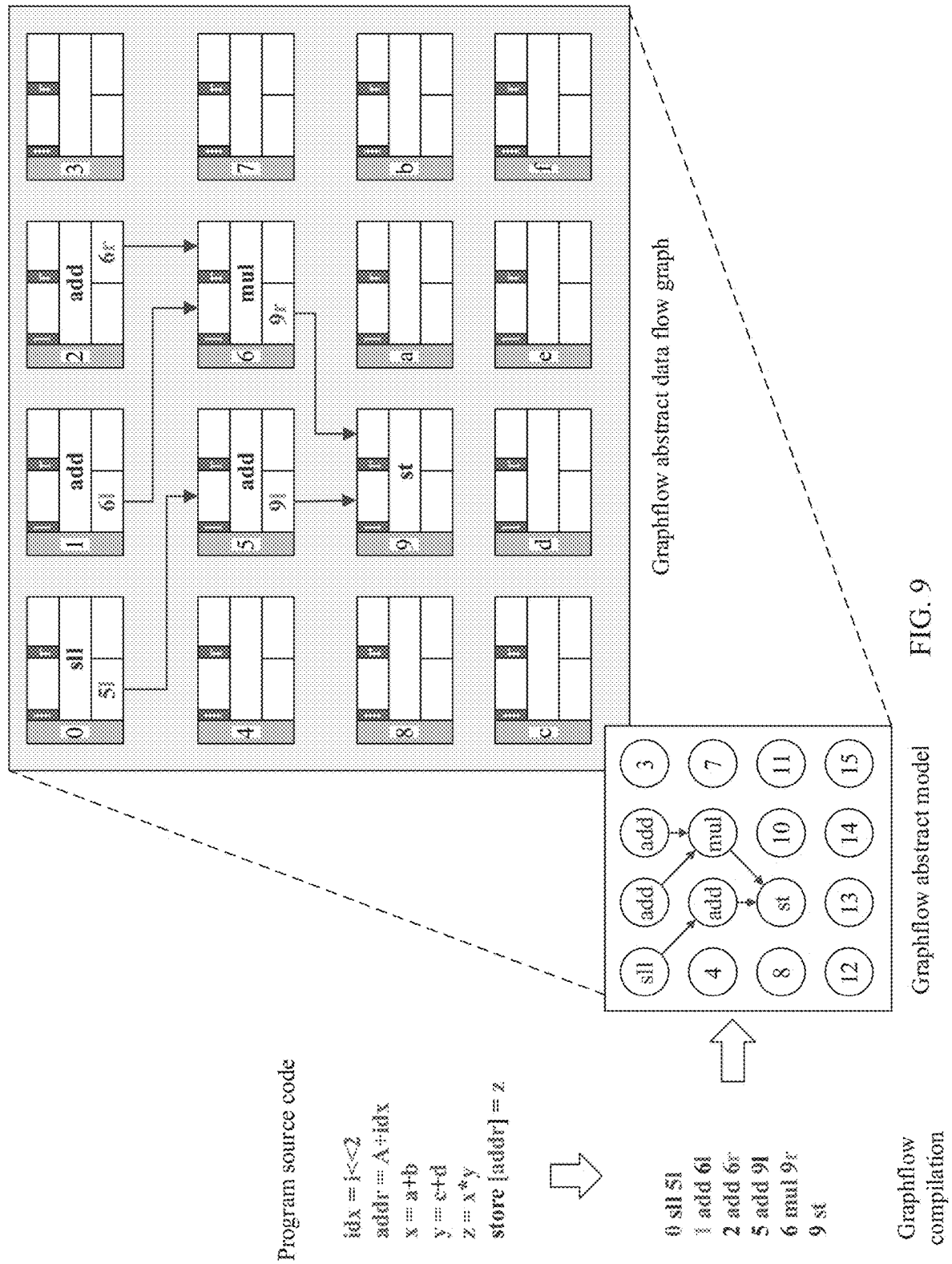
FIG. 9 is a schematic diagram of abstracting code into a data flow graph according to an embodiment of the present application.

For example, in this application, variables of a segment of code may be connected to form a graph, and then written as shown in FIG. 9. FIG. 9 is a schematic diagram of abstracting code into a data flow graph according to an embodiment of the present application.

Instructions 0, 1, 2, 5, 6, and 9 are placed on corresponding calculation units based on IDs of the instructions. An address of A[i] is calculated in 0 and 5, and data (a+b)*(c+d) is calculated in the instructions 1, 2, and 6. Each instruction represents a data flow direction. A corresponding input and connection are configured at a graph build stage.

At an execute stage, all calculation nodes check, in parallel, whether inputs of the calculation nodes are ready, so that the foregoing compilation is semantically executed concurrently rather than sequentially. 2add 6r means that "once both inputs 2l and 2r of an addition operation of the instruction 2 arrive, the addition operation is performed and an operation result is transmitted to a right input (6r) of the instruction 6". For example, 9st means that "once both inputs 9l and 9r of a store operation of the instruction 9 arrive, the store operation is performed". Store does not need to send data to another instruction, and therefore, a destination does not need to be declared in the instruction 9.

It can be seen from a connection of the graph that a degree of parallelism between instructions is obvious (for example, the instructions 0, 1, and 2 and the instructions 5 and 6). The only thing that the hardware needs to do is to check in parallel whether an input required by each node arrives. This is why the Graphflow architecture does not require a large amount of logic for hardware dependency analysis. At an execute stage, for each node, an operation can be performed provided that an input of the node arrives. Therefore, source information of the instruction does not need to be placed in code of a flow instruction. An input of each flow instruction may be dynamically input by different nodes, or may be transmitted by another hardware module. An operation of each instruction can be performed regardless of where the instruction reads data, provided that another instruction transmits data required by the another instruction to the instruction. If an input of the instruction has not arrived, the instruction waits. Therefore, execution of the Graphflow is transmitted in an out-of-order manner and executed concurrently, and a fixed quantity of clock cycles of each calculation node is not required. Therefore, there is no extract graph state (Exact State) when being interrupted at any time in a Graphflow operation process. However, an intermediate state of the graph is stored in a left buffer and a right buffer of each instruction. Therefore, the intermediate state may be stored in a memory.

Figure 10:
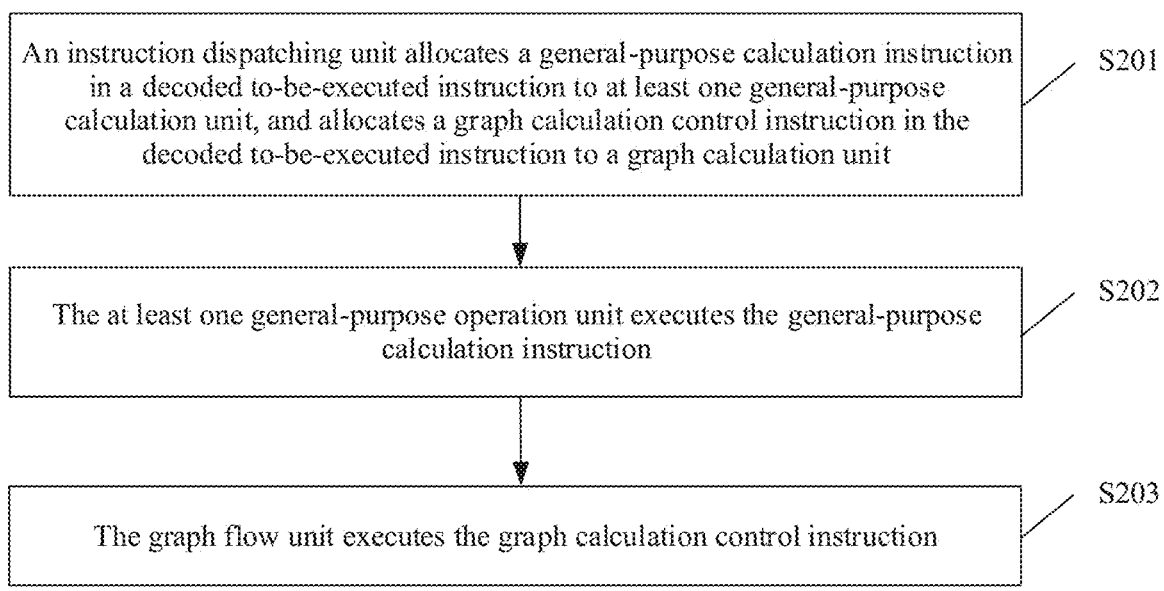
FIG. 10 is a schematic flowchart of a processing method according to an embodiment of the present application.

FIG. 10 is a schematic flowchart of a processing method according to an embodiment of the present application. The processing method is applied to a processor, and the processor includes a processor core. The processor core includes an instruction dispatching unit and a graph flow unit and at least one general-purpose operation unit that are connected to the instruction dispatching unit. In addition, the processing method is applicable to any processor in FIG. 1 to FIG. 3 and a device (such as a mobile phone, a computer, or a server) that includes the processor. The method may include the following step S201 and step S203.

Step S201: The instruction dispatching unit allocates a general-purpose calculation instruction in a decoded to-be-executed instruction to the at least one general-purpose calculation unit, and allocates a graph calculation control instruction in the decoded to-be-executed instruction to the graph calculation unit, where the general-purpose calculation instruction is used to instruct to execute a general-purpose calculation task, and the graph calculation control instruction is used to instruct to execute a graph calculation task.

Step S202: The at least one general-purpose operation unit executes the general-purpose calculation instruction.

Step S203: The graph flow unit executes the graph calculation control instruction.

In a possible implementation, the processor core further includes an instruction fetching unit and an instruction decoding unit, and the method further includes:
the instruction fetching unit obtains a to-be-executed target program; and
the instruction decoding unit decodes the target program to obtain the decoded to-be-executed instruction.

In a possible implementation, the processor core further includes a result write-back unit, and the graph flow unit and the general-purpose operation unit are separately connected to the result write-back unit. The method further includes:
the at least one general-purpose operation unit sends a first execution result of the general-purpose calculation task to the result write-back unit, where the first execution result of the general-purpose calculation task is a result obtained after the general-purpose calculation instruction is executed;
the graph flow unit sends a second execution result of the graph calculation task to the result write-back unit, where the second execution result of the graph calculation task is a result obtained after the graph calculation control instruction is executed; and
the result write-back unit writes back one of or both the first execution result and the second execution result to the instruction dispatching unit.

In a possible implementation, the processor further includes a memory unit, the graph flow unit includes N calculation nodes, the graph calculation control instruction includes a graph build start instruction, the graph build start instruction carries a target address in the memory unit, and that the graph flow unit executes the graph calculation control instruction includes:
the graph flow unit receives the graph build start instruction, and reads graph build block information from the memory unit based on the target address, where the graph build block information includes an operation method of each of the N calculation nodes and connection and sequence information of the N calculation nodes.

In a possible implementation, the graph calculation control instruction includes a parameter pass instruction, the parameter pass instruction carries identifiers of M calculation nodes and input parameters separately corresponding to the identifiers of the M calculation nodes, the M calculation nodes are some or all nodes in the N nodes, and that the graph flow unit executes the graph calculation control instruction includes:
the graph flow unit receives the parameter pass instruction, and separately inputs the input parameters separately corresponding to the identifiers of the M calculation nodes into the M calculation nodes.

In a possible implementation, the connection and sequence information of the N calculation nodes includes source nodes and destination nodes that are separately corresponding to L edges, and that the graph flow unit executes the graph calculation control instruction includes:
the graph flow unit monitors whether an input parameter required by each of the N calculation nodes is ready, inputs an input parameter of a target calculation node whose input parameter is ready into an operation method corresponding to the target calculation node for calculation, to obtain a calculation result, and inputs a calculation result of a source node on each edge into a corresponding destination node as an input parameter based on the source nodes and the destination nodes that are separately corresponding to the L edges.

In a possible implementation, the graph calculation control instruction includes a graph calculation start instruction, and that the graph flow unit executes the graph calculation control instruction to obtain an execution result of the graph calculation task includes:
after receiving the graph calculation start instruction, the graph flow unit checks whether the graph build block information read by the graph flow unit is consistent with an address of a pre-started graph build block, and determines whether the input parameters in the M calculation nodes have been input, and if the graph build block information is consistent with the address of the pre-started graph build block and the input parameters in the M calculation nodes have been input, starts to execute the graph calculation task.

In a possible implementation, the method further includes:
after the graph flow unit receives the graph calculation start instruction and before the graph calculation task is completed, the instruction dispatching unit controls the processor core to enter a blocking state.

In a possible implementation, the method further includes:

the instruction dispatching unit sends an execution result synchronization instruction to the graph flow unit, and after the graph flow unit receives the execution result synchronization instruction and before the graph calculation task is completed, controls the processor core to enter a blocking state.

In a possible implementation, the method further includes:

after the graph flow unit completes the graph calculation task, the instruction dispatching unit controls the processor core to exit the blocking state.

In a possible implementation, the processor core further includes a result write-back unit, and the write-back unit includes a plurality of registers. The graph flow unit and the at least one general-purpose operation unit are separately connected to the result write-back unit. The graph calculation control instruction includes a parameter return instruction, and the parameter return instruction carries identifiers of K calculation nodes and registers separately corresponding to the identifiers of the K calculation nodes. That the graph flow unit executes the graph calculation control instruction to obtain an execution result of the graph calculation task includes:

the graph flow unit controls to separately send calculation results of the K calculation nodes to the corresponding registers in the result write-back unit.

In a possible implementation, the general-purpose operation instruction includes a general-purpose arithmetic logical instruction, the at least one general-purpose operation unit includes an arithmetic logical unit ALU, and that the at least one general-purpose operation unit executes the general-purpose calculation instruction includes:

the arithmetic logical unit ALU receives a general-purpose arithmetic logical instruction sent by the instruction dispatching unit, and performs a logical operation.

Alternatively, in a possible implementation, the general-purpose operation instruction includes a load/store instruction, the at least one general-purpose operation unit includes a load/store unit LSU, and that the at least one general-purpose operation unit executes the general-purpose calculation instruction to obtain an execution result of the general-purpose calculation task includes:

the load/store unit LSU receives a load/store instruction sent by the instruction dispatching unit, and performs a load/store operation.

In a possible implementation, the graph calculation control instruction includes a data read/write instruction, and the data read/write instruction carries a load/store address. The method further includes:

the graph flow unit reads data from the load/store unit LSU or writes data into the load/store unit LSU based on the load/store address in the data read/write instruction.

In a possible implementation, the at least one general-purpose operation unit further includes a floating point unit FPU, and the graph calculation task includes a floating point operation. The method further includes:

the graph flow unit sends data of the floating point operation to the floating point unit FPU for calculation, and receives a calculation result fed back by the FPU.

Alternatively, in a possible implementation, the at least one general-purpose operation unit further includes a vector operation unit SIMD, and the graph calculation task includes a vector operation. The method further includes:

the graph flow unit sends data of the vector operation to the vector operation unit SIMD for calculation, and receives a calculation result fed back by the SIMD.

It should be noted that for a specific procedure of the processing method described in this embodiment of the present application, refer to related descriptions in the foregoing embodiments of the present application described in FIG. 1 to FIG. 9. Details are not described herein again.

An embodiment of the present application further provides a computer-readable storage medium. The computer-readable storage medium may store a program, and when the program is executed by a processor, the processor may be enabled to perform some or all of the steps described in any one of the foregoing method embodiments.

An embodiment of the present application further provides a computer program. The computer program includes instructions, and when the computer program is executed by a multi-core processor, the processor may be enabled to perform some or all of the steps described in any one of the foregoing method embodiments.

In the foregoing embodiments, the description of each embodiment has respective focuses. For a part that is not described in detail in an embodiment, reference may be made to related descriptions in other embodiments.

It should be noted that, for brief description, the foregoing method embodiments are represented as a series of actions. However, a person skilled in the art should appreciate that this application is not limited to the described order of the actions, because according to this application, some steps may be performed in other orders or simultaneously. It should be further appreciated by a person skilled in the art that embodiments described in this specification all belong to preferred embodiments, and the involved actions and modules are not necessarily required by this application.

In the several embodiments provided in this application, it should be understood that the disclosed apparatus may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The foregoing units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of this application essentially, or all or some of the technical solutions may be implemented in the form of a software product. The computer software product is stored in a storage medium and includes several instructions for instructing a computer device (which may be a personal computer, a server, a network device, or the like, and may be specifically a processor in the computer device) to perform all or some of the steps of the methods described in embodiments of this application. The foregoing storage medium may include any medium that can store program code, such as a USB flash drive, a removable hard disk, a magnetic disk, an optical disc, a read-only memory (Read-Only Memory, ROM for short), or a random access memory (Random Access Memory, RAM for short).

The foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A processor, comprising:
   a memory;
   a processor core, wherein the processor core comprises an instruction dispatching circuit, a graph flow circuit and at least one general-purpose operation circuit that are connected to the instruction dispatching circuit, wherein
   the instruction dispatching circuit is configured to:
      allocate a general-purpose calculation instruction to at least one general-purpose calculation circuit, and
      allocate a graph calculation control instruction to a graph flow circuit, wherein the general-purpose calculation instruction instructs the processor to execute a general-purpose calculation task, and the graph calculation control instruction instructs the processor to execute a graph calculation task;
   the at least one general-purpose operation circuit is configured to execute the general-purpose calculation instruction;
   the graph flow circuit is configured to:
      execute the graph calculation control instruction, wherein the graph calculation control instruction comprises a graph calculation start instruction and a graph build start instruction, and wherein the graph build start instruction carries a target address in the memory;
      receive the graph build start instruction;
      read graph build block information from the memory based on the target address, wherein the graph flow circuit comprises N calculation nodes, and wherein the graph build block information comprises an operation method of each of the N calculation nodes and connection and sequence information of the N calculation nodes;
      check whether the graph build block information is consistent with an address of a pre-started graph build block;
      determine whether input parameters in M calculation nodes have been input; and
      in response to determining that the graph build block information is consistent with the address of the pre-started graph build block and the input parameters in the M calculation nodes have been input, execute the graph calculation task.

2. The processor according to claim 1, wherein the processor core further comprises:
   an instruction fetching circuit, configured to obtain a target program; and
   an instruction decoding circuit, configured to decode the target program to obtain the general-purpose calculation instruction and graph calculation control instruction.

3. The processor according to claim 1, wherein the processor core further comprises a result write-back circuit, and the graph flow circuit and the at least one general-purpose operation circuit are separately connected to the result write-back circuit:
   the at least one general-purpose operation circuit is further configured to send a first execution result of the general-purpose calculation task to the result write-back circuit, wherein the first execution result of the general-purpose calculation task is a result obtained after the general-purpose calculation instruction is executed;
   the graph flow circuit is further configured to send a second execution result of the graph calculation task to the result write-back circuit, wherein the second execution result of the graph calculation task is a result obtained after the graph calculation control instruction is executed; and
   the result write-back circuit is configured to write back one or both of the first execution result and the second execution result to the instruction dispatching circuit.

4. The processor according to claim 1, wherein the graph calculation control instruction comprises a parameter pass instruction, the parameter pass instruction carries identifiers of M calculation nodes and input parameters corresponding to the identifiers of the M calculation nodes, and the M calculation nodes are some or all nodes in the N calculation nodes; and
   the graph flow circuit is configured to:
      receive the parameter pass instruction, and
      input the input parameters corresponding to the identifiers of the M calculation nodes into the M calculation nodes.

5. The processor according to claim 4, wherein the connection and sequence information of the N calculation nodes comprises source nodes and destination nodes that are corresponding to L edges, and the graph flow circuit is configured to:
   monitor whether an input parameter for each of the N calculation nodes is ready;
   input an input parameter of a target calculation node into an operation method corresponding to the target calculation node for calculation, to obtain a calculation result; and
   input a calculation result of a source node on each edge into a corresponding destination node as an input parameter based on the source nodes and the destination nodes corresponding to the L edges.

6. The processor according to claim 1, wherein the instruction dispatching circuit is further configured to:
   after the graph flow circuit receives the graph calculation start instruction and before the graph calculation task is completed, control the processor core to enter a blocking state.

7. The processor according to claim 6, wherein the instruction dispatching circuit is further configured to:

after the graph flow circuit completes the graph calculation task, control the processor core to exit the blocking state.

8. The processor according to claim 1, wherein the instruction dispatching circuit is further configured to:
send an execution result synchronization instruction to the graph flow circuit; and
after the graph flow circuit receives the execution result synchronization instruction and before the graph calculation task is completed, control the processor core to enter a blocking state.

9. A processing method comprising:
allocating, by an instruction dispatching unit comprised in a processor core in a processor, a general-purpose calculation instruction to at least one general-purpose calculation unit comprised in the processor core;
allocating, by the instruction dispatching unit, a graph calculation control instruction to a graph flow unit, wherein the general-purpose calculation instruction instructs the processor to execute a general-purpose calculation task, and the graph calculation control instruction instructs the processor to execute a graph calculation task;
executing, by at least one general-purpose operation unit comprised in the processor core, the general-purpose calculation instruction;
executing, by the graph flow unit comprised in the processor core, the graph calculation control instruction, wherein at least one general-purpose operation unit is connected to the instruction dispatching unit and the graph flow unit, wherein the graph calculation control instruction comprises a graph calculation start instruction and a graph build start instruction, and wherein the graph build start instruction carries a target address in a memory in the processor;
receiving, by the graph flow unit, the graph build start instruction;
reading, by the graph flow unit, graph build block information from the memory based on the target address, wherein the graph flow unit comprises N calculation nodes, and wherein the graph build block information comprises an operation method of each of the N calculation nodes and connection and sequence information of the N calculation nodes;
checking, by the graph flow unit, whether the graph build block information is consistent with an address of a pre-started graph build block;
determining, by the graph flow unit, whether input parameters in M calculation nodes have been input; and
in response to determining that the graph build block information is consistent with the address of the pre-started graph build block and the input parameters in the M calculation nodes have been input, executing, by the graph flow unit, the graph calculation task.

10. The method according to claim 9, wherein the processor core further comprises an instruction fetching unit and an instruction decoding unit, and the method further comprises:
obtaining, by the instruction fetching unit, a target program; and
decoding, by the instruction decoding unit, the target program to obtain the general-purpose calculation instruction and graph calculation control instruction.

11. The method according to claim 9, wherein the processor core further comprises a result write-back unit, the graph flow unit and the at least one general-purpose operation unit are separately connected to the result write-back unit, and the method further comprises:
sending, by the at least one general-purpose operation unit, a first execution result of the general-purpose calculation task to the result write-back unit, wherein the first execution result of the general-purpose calculation task is a result obtained after the general-purpose calculation instruction is executed;
sending, by the graph flow unit, a second execution result of the graph calculation task to the result write-back unit, wherein the second execution result of the graph calculation task is a result obtained after the graph calculation control instruction is executed; and
writing back, by the result write-back unit, one or both of the first execution result and the second execution result to the instruction dispatching unit.

12. The method according to claim 9, wherein the graph calculation control instruction comprises a parameter pass instruction, the parameter pass instruction carries identifiers of M calculation nodes and input parameters corresponding to the identifiers of the M calculation nodes, the M calculation nodes are some or all nodes in the N calculation nodes, and the method further comprises:
executing, by the graph flow unit, the graph calculation control instruction based on performing:
receiving the parameter pass instruction, and
inputting the input parameters corresponding to the identifiers of the M calculation nodes into the M calculation nodes.

13. The method according to claim 12, wherein the connection and sequence information of the N calculation nodes comprises source nodes and destination nodes that are corresponding to L edges, and the method further comprises:
executing, by the graph flow unit, the graph calculation control instruction based on performing:
monitoring, by the graph flow unit, whether an input parameter for each of the N calculation nodes is ready,
inputting an input parameter of a target calculation node into an operation method corresponding to the target calculation node for calculation, to obtain a calculation result, and
inputting a calculation result of a source node on each edge into a corresponding destination node as an input parameter based on the source nodes and the destination nodes corresponding to the L edges.

14. The method according to claim 9, wherein the method further comprises:
after the graph flow unit receives the graph calculation start instruction and before the graph calculation task is completed, controlling, by the instruction dispatching unit, the processor core to enter a blocking state.

15. The method according to claim 9, wherein the method further comprises:
sending, by the instruction dispatching unit, an execution result synchronization instruction to the graph flow unit, and
after the graph flow unit receives the execution result synchronization instruction and before the graph calculation task is completed, controlling the processor core to enter a blocking state.

16. A non-transitory computer-readable storage medium storing one or more instructions executable by a processor to perform operations comprising:
allocating, by an instruction dispatching unit comprised in a processor core in a processor, a general-purpose calculation instruction to at least one general-purpose calculation unit comprised in the processor core;

allocating, by the instruction dispatching unit, a graph calculation control instruction to a graph flow unit, wherein the general-purpose calculation instruction instructs the processor to execute a general-purpose calculation task, and the graph calculation control instruction instructs the processor to execute a graph calculation task;

executing, by at least one general-purpose operation unit comprised in the processor core, the general-purpose calculation instruction;

executing, by the graph flow unit comprised in the processor core, the graph calculation control instruction, wherein at least one general-purpose operation unit is connected to the instruction dispatching unit and the graph flow unit, wherein the graph calculation control instruction comprises a graph calculation start instruction and a graph build start instruction, and wherein the graph build start instruction carries a target address in a memory in the processor;

receiving, by the graph flow unit, the graph build start instruction;

reading, by the graph flow unit, graph build block information from the memory based on the target address, wherein the graph flow unit comprises N calculation nodes, and wherein the graph build block information comprises an operation method of each of the N calculation nodes and connection and sequence information of the N calculation nodes;

checking, by the graph flow unit, whether the graph build block information is consistent with an address of a pre-started graph build block;

determining, by the graph flow unit, whether input parameters in M calculation nodes have been input; and in response to determining that the graph build block information is consistent with the address of the pre-started graph build block and the input parameters in the M calculation nodes have been input, executing, by the graph flow unit, the graph calculation task.

* * * * *

UNITED STATES PATENT AND TRADEMARK OFFICE
CERTIFICATE OF CORRECTION

PATENT NO.       : 12,086,592 B2
APPLICATION NO.  : 18/070781
DATED            : September 10, 2024
INVENTOR(S)      : Xiping Zhou et al.

Page 1 of 1

It is certified that error appears in the above-identified patent and that said Letters Patent is hereby corrected as shown below:

In the Claims

In Column 35, In Line 41, In Claim 1, delete "task:" and insert -- task; --.

In Column 36, In Line 16 (Approx.), In Claim 3, delete "circuit:" and insert -- circuit; --.

Signed and Sealed this
Seventeenth Day of December, 2024

Derrick Brent
*Acting Director of the United States Patent and Trademark Office*